(12) United States Patent
Archambault et al.

(10) Patent No.: US 12,742,897 B2
(45) Date of Patent: Sep. 22, 2026

(54) PRIOR-KNOWLEDGE-BASED SPECTRAL UNMIXING METHODS

(71) Applicants: MEDSCINT INC., Quebec City (CA); UNIVERSITE LAVAL, Quebec City (CA)

(72) Inventors: Louis Archambault, Quebec City (CA); Boby Lessard, Quebec City (CA); Frederic Marcotte, Trois-Rivieres (CA); François Therriault-Proulx, Quebec City (CA); Simon Lambert-Girard, Quebec City (CA)

(73) Assignees: MEDSCINT INC., Quebec City (CA); UNIVERSITE LAVAL, Quebec City (CA)

( * ) Notice: Subject to any disclaimer, the term of this patent is extended or adjusted under 35 U.S.C. 154(b) by 244 days.

(21) Appl. No.: 18/763,380

(22) Filed: Jul. 3, 2024

(65) Prior Publication Data

US 2025/0020821 A1 Jan. 16, 2025

Related U.S. Application Data

(60) Provisional application No. 63/512,923, filed on Jul. 11, 2023.

(51) Int. Cl.
*G01J 3/00* (2006.01)
*G01J 3/28* (2006.01)
(Continued)

(52) U.S. Cl.
CPC ................ *G01T 1/362* (2013.01); *G01J 3/28* (2013.01); *G01T 1/023* (2013.01); *G01T 7/005* (2013.01); *G01J 2003/2833* (2013.01)

(58) Field of Classification Search
CPC .............................................. G01J 2003/2833
See application file for complete search history.

(56) References Cited

U.S. PATENT DOCUMENTS 9,678,217 B2 6/2017 Therriault-Proulx et al.
2021/0118111 A1* 4/2021 Ti ............................ G06T 5/50
(Continued)

OTHER PUBLICATIONS

W. Wang, Y. Qian, and H. Liu, Multiple Clustering Guided Non-negative Matrix Factorization for Hyperspectral Unmixing, IEEE Journal of Selected Topics in Applied Earth Observations and Remote Sensing, vol. 13, pp. 5162 5179, 2020, conference Name: IEEE Journal of Selected Topics in Applied Earth Observations and Remote Sensing.
(Continued)

*Primary Examiner* — Dani Fox
(74) *Attorney, Agent, or Firm* — Stanek Lemon Crouse & Meeks, PA

(57) ABSTRACT

Disclosed is a method for spectrally unmixing spectral data originating from a set of spectral sources and including a series of one or more optical spectra. The method can include modeling the spectral data using an endmember matrix and an abundance matrix, the endmember matrix including a set of endmember spectra respectively corresponding to the set of spectral sources, and the abundance matrix indicates an abundance of each endmember spectrum in each spectrum. The method can also include providing external prior spectral information comprising prior endmember information and prior abundance information conveying at least partial prior knowledge about the endmember matrix and the abundance matrix, respectively, and performing a spectral unmixing operation on the spectral data to determine a solution for the endmember and abundance matrices, using the external prior spectral information as input. The method can be employed for calibrating spectral detection systems such as scintillator-based fiber dosimeters.

27 Claims, 10 Drawing Sheets

(51) Int. Cl.
*G01T 1/02* (2006.01)
*G01T 1/36* (2006.01)
*G01T 7/00* (2006.01)

(56) References Cited

U.S. PATENT DOCUMENTS

2021/0396580 A1* 12/2021 Janiczek ............... G01J 3/2823
2024/0273678 A1* 8/2024 Valm ....................... G06T 7/174

OTHER PUBLICATIONS

W. Tang, Nonnegative matrix factorization for hyperspectral unmixing using prior knowledge of spectral signatures, Optical Engineering, vol. 51, No. 8, p. 087001, Aug. 2012.

J. Sigurdsson, M. O. Ulfarsson, and J. R. Sveinsson, Endmember constrained semisupervised hyperspectral unmixing, in 2014 6th Workshop on Hyperspectral Image and Signal Processing: Evolution in Remote Sensing (Whispers). Lausanne, Switzerland: IEEE, Jun. 2014, pp. 1 4.

L. Tong, J. Zhou, Y. Qian, X. Bai, and Y. Gao, Nonnegative-Matrix—Factorization-Based Hyperspectral Unmixing With Partially Known Endmembers, IEEE Transactions on Geoscience and Remote Sensing, vol. 54, No. 11, pp. 6531 6544, Nov. 2016, conference Name: IEEE.

F. Therriault-Proulx, L. Archambault, L. Beaulieu, and S. Beddar, Development of a novel multi-point plastic scintillation detector with a single optical transmission line for radiation dose measurement, Physics in Medicine and Biology, vol. 57, No. 21, pp. 7147 7159, Nov. 2012, No. 21.

B. Lessard et al., Non-negative Matrix Factorization using Partial Prior Knowledge for Radiation Dosimetry , arXiv:2309.09360 (submitted on Sep. 17, 2023, revised Jun. 14, 2024) (available at https://arxiv.org/abs/2309.09360).

* cited by examiner

MUR Algorithm
HALS Algorithm
Evaluation of the objective function
$10^{-1}$
$10^{-2}$
$10^0$
$10^1$
$10^2$
$10^3$
$10^4$ MUR Algorithm
HALS Algorithm
Evaluation of the objective function
$10^0$
$10^{-1}$
$10^{-2}$
Number of iterations

PRIOR-KNOWLEDGE-BASED SPECTRAL UNMIXING METHODS

CROSS-REFERENCE TO RELATED APPLICATIONS

This application claims priority under 35 U.S.C. § 119(e) to U.S. Provisional Patent Application Ser. No. 63/512,923, filed on Jul. 11, 2023, which is incorporated herein in its entirety by reference.

TECHNICAL FIELD

The technical field relates to spectral unmixing, specifically to spectral unmixing methods based on prior knowledge.

BACKGROUND

Spectral unmixing of multi- and hyperspectral data is used in various fields, such as medical physics, geoscience, remote sensing imaging, computer vision, biophotonics, and astrophysics. This process involves decomposing a mixed-signal spectrum into its constituent spectra (also referred to as "spectral signatures" or "endmembers") and their corresponding fractional abundances. In the field of medical physics, spectral unmixing can be used in dose measurements during radiotherapy with plastic scintillation detectors (PSDs). Radiotherapy is a cancer treatment modality that employs ionizing radiation to target cancerous cells while sparing healthy tissues. A medical linear accelerator (linac) is often used to deliver these radiation doses. Accurate monitoring of radiation delivery aims to ensure patient safety and treatment efficiency. PSDs are advantageous for dose measurements in radiotherapy due to their water equivalence and real-time dose reading. Multipoint plastic scintillation detectors (mPSDs) can expand the capabilities of traditional PSDs by incorporating spatially distributed scintillating elements having distinct emission spectra. These scintillating elements produce optical signals that are combined into a single optical fiber and delivered to a common photodetector. The amount of light produced by each scintillator correlates with the radiation dose deposited at its location, allowing simultaneous dose measurements at multiple locations. A raw measurement performed with an mPSD generally consists of a single spectral measurement composed of a superposition of two or more spectral components originating from the scintillators themselves and the optical fiber (e.g., stem effect). Spectral unmixing can be used to determine the contribution of each spectral component to the measured spectrum. The fractional abundance of each scintillator is representative of its light output and, thus, its received radiation dose. Accurate estimation of the abundances of different light-emitting components for dose measurements depends on the precise determination of their spectral signatures, which is not straightforward.

Many spectral unmixing techniques have been developed in various different fields of application. These techniques can be broadly categorized based on whether pure spectral measurements (i.e., measurements composed of a single endmember) are assumed to be present or not. Non-negative matrix factorization (NMF) techniques are examples of unmixing algorithms that do not require pure spectral measurements. These techniques model the spectral measurement matrix as the product of two matrices: an endmember matrix and an abundance matrix. Starting from initial guesses for both matrices, a gradient descent approach can be used to iteratively find a solution. The inherent non-negativity of NMF makes is beneficial for use in spectral unmixing, as it ensures positive spectral signatures and abundances. However, NMF lacks a unique solution and is prone to getting trapped in local minima due to its non-convex objective function. Despite ongoing efforts to address or mitigate the drawbacks and limitations of NMF and other spectral unmixing techniques, several difficulties and challenges remain in the field.

SUMMARY

The present description generally relates to spectral unmixing techniques using external prior knowledge about endmember and abundance information.

In accordance with an aspect, there is provided method for spectrally unmixing spectral data originating from a set of spectral sources and including a series of one or more measured optical spectra, the method including:

- modeling the spectral data using a current endmember matrix and a current abundance matrix to be determined, wherein the current endmember matrix includes a set of current endmember spectra respectively corresponding to the set of spectral sources, and wherein the current abundance matrix indicates an abundance of each current endmember spectrum in the or each measured optical spectrum;
- providing external prior spectral information including prior endmember information and prior abundance information, wherein the prior endmember information conveys at least partial prior knowledge about the current endmember matrix, and wherein the prior abundance information conveys at least partial prior knowledge about the current abundance matrix; and
- performing a spectral unmixing operation on the spectral data to determine a solution for the current endmember matrix and the current abundance matrix, wherein the spectral unmixing operation uses the external prior spectral information as input.

In some embodiments, the method further includes measuring the series of one or more measured optical spectra under a respective series of one or more current irradiation conditions. In some embodiments, the external prior spectral information corresponds to prior irradiation conditions that are representative of at least part of the series of one or more current irradiation conditions.

In some embodiments, measuring the series of one or more measured spectra includes:

- irradiating the spectral sources with ionizing radiation in accordance with the respective current irradiation condition; and
- detecting radiation-induced light emitted by the spectral sources in response to the ionizing radiation.

In some embodiment, the ionizing radiation includes electromagnetic radiation, for example, X-rays or gamma rays. In some embodiments, the ionizing radiation includes particle radiation, for example, electrons, protons, neutrons, or heavy ions.

In some embodiments, providing the external prior spectral information includes deriving the external prior spectral information from modeling data (e.g., analytical and/or empirical), experimental data, or both.

In some embodiments, providing the external prior spectral information includes:

- experimentally determining the prior endmember information as a prior endmember matrix, wherein the prior endmember matrix includes a set of prior endmember spectra corresponding to the set of spectral sources; and experimentally determining the prior abundance information as a prior abundance matrix, including:

measuring a series of one or more prior optical spectra corresponding to light received from the set of spectral sources, or from an equivalent set of spectral sources, under a respective series of one or more prior irradiation conditions representative of the series of one or more current irradiation conditions; and deriving the prior abundance matrix from the series of one or more prior optical spectra and the prior endmember matrix, wherein the prior abundance matrix indicates an abundance of each prior endmember spectrum in the or each prior optical spectrum.

In some embodiments, the solution for the current endmember matrix and/or the current abundance matrix is used as external prior spectral information in a subsequent implementation of the spectral unmixing method.

In some embodiments, at least one of the spectral sources is an active light source, for instance, a luminescent material. Examples of luminescent materials include scintillating materials, which are materials that emit light when excited by ionizing radiation. In some embodiments, at least one of the spectral sources is a passive light source, for example, a source that emits light by specular or diffuse reflection.

In some embodiments, the set of spectral sources includes at least one scintillating component and at least one contaminating component. In some embodiments, the at least one scintillating component is at least one plastic scintillating component. In some embodiments, the at least one contaminating component includes a source of unwanted fluorescence radiation, a source of unwanted Cherenkov radiation, or both a source of unwanted fluorescence radiation and a source of unwanted Cherenkov radiation.

In some embodiments, the spectral data is measured by a spectral detection system, and at least one of the spectral sources is part of the spectral detection system. In some embodiments, at least one of the spectral sources is not part of the spectral detection system, but rather is part of the environment or scene of the spectral detection system.

In some embodiments, the spectral detection system includes a system component that provides multiple ones of the spectral sources. In some embodiments, the system component is an optical fiber, and the multiple spectral sources include a source of fluorescence radiation and a source of Cherenkov radiation, or spatially distributed sources of Cherenkov radiation.

In some embodiments, the spectral detection system is a radiation dosimeter including:

a scintillation unit including at least one scintillating element configured to emit scintillation light in response to irradiation by an irradiation source, wherein the at least one scintillating element provides at least one of the spectral sources; and a spectral detector configured to detect the scintillation light emitted by the at least one scintillating element as at least part of the spectral data.

In some embodiments, the at least one scintillating element is a plurality of scintillating elements disposed at a plurality of locations within the scintillation unit.

In some embodiments, the radiation dosimeter includes a collection light guide optically coupled to the at least one scintillating element and configured to deliver the scintillation light emitted by the at least one scintillating element to the spectral detector. In some embodiments, the collection light guide consists of a single optical fiber. In some embodiments, the plurality of scintillating elements are disposed within the collection light guide.

In some embodiments, the collection light guide provides at least one of the spectral sources. In some embodiments, the at least one spectral source provided by the collection light guide includes a source of fluorescence radiation and a source of Cherenkov radiation. In some embodiments, the at least one spectral source provided by the collection light guide includes a first source of Cherenkov radiation and a second source of Cherenkov radiation, the first and second sources of Cherenkov radiation corresponding to different emission locations within the collection light guide.

In some embodiments, performing the spectral unmixing operation includes optimizing an objective function. In some embodiments, the objective function (i) relates a difference between the spectral data and a product of the current endmember matrix and the current abundance matrix to be determined, and (ii) incorporates the external prior spectral information. In some embodiments, the objective function is optimized by a deterministic optimization method, such as a gradient descent method. In some embodiments, the objective function incorporates therein (i) endmember trust coefficients indicative of a confidence level in the prior knowledge about the current endmember matrix conveyed by the prior endmember information, and (ii) abundance trust coefficients indicative of a confidence level in the prior knowledge about the current abundance matrix conveyed by the prior abundance information. In some embodiments, the values of the endmember trust coefficients and the values of the abundance trust coefficients are set on an element-wise basis. In some embodiments, optimizing the objective function includes performing a non-negative matrix factorization (NMF) procedure.

In accordance with another aspect, there is provided a method for calibrating a spectral detection system having a spectral response including contributions from a set of spectral sources, the method including:

measuring the spectral response of the spectral detection system under a series of one or more current irradiation conditions to acquire current calibration data including a respective series of one or more current calibration spectra;

modeling the current calibration data using a current endmember matrix and a current abundance matrix to be determined, wherein the current endmember matrix includes a set of current endmember spectra respectively corresponding to the set of spectral sources, and wherein the current abundance matrix indicates an abundance of each current endmember spectrum in the or each current calibration spectrum;

providing external prior calibration information including prior endmember information and prior abundance information, wherein the prior endmember information conveys at least partial prior knowledge about the current endmember matrix, and wherein the prior abundance information conveys at least partial prior knowledge about the current abundance matrix; and performing a spectral unmixing operation on the current calibration data to determine a solution for the current endmember matrix and the current abundance matrix, thereby calibrating the spectral detection system, wherein the spectral unmixing operation uses the external prior spectral information as input.

In some embodiments, the external prior calibration information includes prior irradiation conditions that are representative of at least part of the series of one or more current irradiation conditions.

In some embodiments, measuring the spectral response of the spectral detection system includes, for the or each current calibration spectrum:

- irradiating the spectral sources with ionizing radiation in accordance with the respective current irradiation condition; and
- detecting radiation-induced light emitted by the spectral sources in response to the ionizing radiation.

In some embodiments, the external prior calibration information is provided from an analytical model, an empirical model, experimental data, or any combination thereof.

In some embodiments, providing the external calibration prior information includes:

- experimentally determining the prior endmember information as a prior endmember matrix, wherein the prior endmember matrix includes a set of prior endmember spectra corresponding to the set of spectral sources; and
- experimentally determining the prior abundance information as a prior abundance matrix, including:
  - measuring a series of one or more prior calibration spectra corresponding to light received from the set of spectral sources, or from an equivalent set of spectral sources, under a respective series of one or more prior irradiation conditions representative of the one or more current irradiation conditions; and
  - determining the prior abundance matrix from the series of one or more prior calibration spectra and the prior endmember matrix, wherein the prior abundance matrix indicates an abundance of each prior endmember spectrum in the or each prior calibration spectrum.

In some embodiments, the solution for the current endmember matrix and/or the current abundance matrix is used as external prior calibration information in a subsequent implementation of the calibration method.

In some embodiments, the spectral detection system is a radiation dosimeter including:

- a scintillation unit including at least one scintillating element configured to emit scintillation light in response to irradiation by an irradiation source, wherein the at least one scintillating element provides at least one of the spectral sources; and
- a spectral detector configured to detect the scintillation light emitted by the at least one scintillating element as at least part of the spectral response.

In some embodiments, the at least one scintillating element is a plurality of scintillating elements disposed at a plurality of locations within the scintillation unit. In some embodiments, the at least one scintillating component is at least one plastic scintillating component.

In some embodiments, the radiation dosimeter includes a collection light guide optically coupled to the at least one scintillating element and configured to deliver the scintillation light emitted by the at least one scintillating element to the spectral detector, and the plurality of scintillating elements are disposed within the collection light guide. In some embodiments, the collection light guide is provided as a single optical fiber.

In some embodiments, the collection light guide provides at least one of the spectral sources as an unwanted source of fluorescence radiation, an unwanted source of Cherenkov radiation, both an unwanted source of fluorescence radiation and an unwanted source of Cherenkov radiation, or two sources of unwanted Cherenkov radiation corresponding to different emission locations within the collection light guide.

In some embodiments, performing the spectral unmixing operation includes optimizing an objective function. In some embodiments, the objective function (i) relates a difference between the current calibration data and a product of the current endmember matrix and the current abundance matrix to be determined, and (ii) incorporates the external prior calibration information. In some embodiments, the objective function is optimized by deterministic optimization method, such as a gradient descent method. In some embodiments, the objective function incorporates therein (i) endmember trust coefficients indicative of a confidence level in the prior knowledge about the current endmember matrix conveyed by the prior endmember information, and (ii) abundance trust coefficients indicative of a confidence level in the prior knowledge about the current abundance matrix conveyed by the prior abundance information. In some embodiments, the values of the endmember trust coefficients and the values of the abundance trust coefficients are set on an element-wise basis. In some embodiments, optimizing the objective function includes performing a non-negative matrix factorization (NMF) procedure.

In accordance with another aspect, there is provided a non-transitory computer readable storage medium having stored thereon computer readable instructions that, when executed by a processor, cause the processor to perform at least part of a spectral unmixing method and/or a calibration method such as disclosed herein.

In accordance with another aspect, there is provided a non-transitory computer readable storage medium having stored thereon computer readable instructions that, when executed by a processor, cause the processor to perform a method for calibrating a spectral detection system having a spectral response including contributions from a set of spectral sources, the method including:

- receiving current calibration data including a series of one or more current calibration spectra acquired by measuring the spectral response of the spectral detection system under a respective series of one or more current irradiation conditions;
- modeling the current calibration data using a current endmember matrix and a current abundance matrix to be determined, wherein the current endmember matrix includes a set of current endmember spectra respectively corresponding to the set of spectral sources, and wherein the current abundance matrix indicates an abundance of each current endmember spectrum in the or each current calibration spectrum;
- providing external prior calibration information including prior endmember information and prior abundance information, wherein the prior endmember information conveys at least partial prior knowledge about the current endmember matrix, and wherein the prior abundance information conveys at least partial prior knowledge about the current abundance matrix; and
- performing a spectral unmixing operation on the current calibration data to determine a solution for the current endmember matrix and the current abundance matrix, thereby calibrating the spectral detection system, wherein the spectral unmixing operation uses the external prior spectral information as input.

In accordance with another aspect, there is provided a computer device including a processor and a non-transitory computer readable storage medium such as disclosed herein, the non-transitory computer readable storage medium being operatively coupled to the processor.

In accordance with another aspect, there is provided a spectral detection system, for example, a scintillator-based fiber dosimeter, wherein the spectral detection includes a computer device such as disclosed herein.

Other method and process steps may be performed before, during, or after the steps described herein. The order of certain steps may also vary, and some steps may be omitted, repeated, and/or combined, as appropriate.

Other features and advantages of the present description will become more apparent upon reading the following non-restrictive description of specific embodiments, given by way of example only, with reference to the appended drawings. Although specific features described in the above summary and the following detailed description may be associated with respect to particular embodiments or aspects, these specific features can be combined with one another, unless stated otherwise.

DETAILED DESCRIPTION

The present description generally relates to prior-knowledge-based spectral unmixing methods. These methods may be useful in various fields, industries, and applications that benefit from or require improved techniques for separating mixed spectral data into endmember spectra and their corresponding fractional abundances. Examples of possible fields of use include medical physics (e.g., radiotherapy dosimetry), geosciences, remote sensing, imaging, computer vision, biophotonics, and astrophysics.

Figure 1:
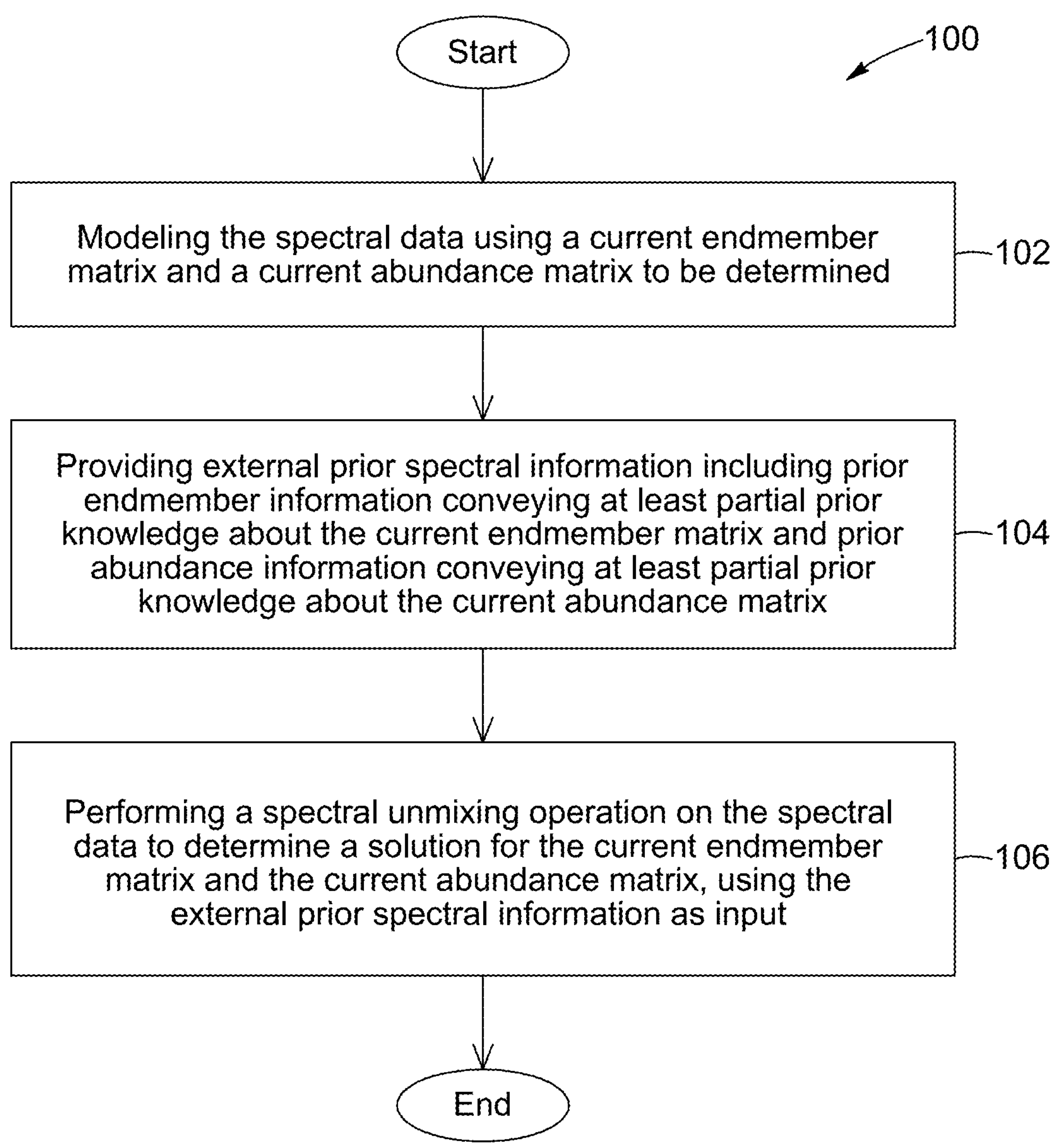
FIG. 1 is a flow diagram illustrating a method for spectrally unmixing spectral data, in accordance with an embodiment.

Referring to FIG. 1, there is depicted a flow diagram of an embodiment of a method 100 for spectrally unmixing spectral data. The spectral data to be unmixed originates from a set of spectral sources and includes a series of one or more measured optical spectra.

The term "spectral source" broadly refers to any spectral entity, whether natural or artificial (i.e., human-made), able to generate a spectrum of light that contributes to the spectral data to be unmixed. In some embodiments, at least one of the spectral sources can be an active light source, that is, a light source generating light actively. Examples of active spectral sources include luminescent materials, such as photoluminescent materials (e.g., fluorescent materials or phosphorescent materials) and radioluminescent materials (e.g., scintillating materials), as well as other types of luminescent materials (e.g., electroluminescent materials, bioluminescent materials, or chemiluminescent materials). Other examples include combinations of luminescent materials with components configured for or capable of modifying the emitted spectrum (e.g., a wavelength shifter, a spectral attenuator), as well as devices, such as light-emitting diodes. In some embodiments, at least one of the spectral sources can be a passive light source, that is, a light source generating light passively, for example, by specular or diffuse reflection of sunlight or ambient light.

In some embodiments, the method 100 includes a step of measuring the series of one or more measured optical spectra. For example, in radiation dosimetry applications, the measuring step can include irradiating the spectral sources with ionizing radiation and detecting radiation-induced light emitted by the spectral sources in response to the ionizing radiation. Depending on the application, the ionizing radiation can include electromagnetic radiation (e.g., X-rays or gamma rays) and/or particle radiation (e.g., electrons, protons, neutrons, or heavy ions). In some embodiments, the method 100 can include a step of receiving or retrieving the series of one or more measured optical spectra from previously performed spectral measurements.

In some embodiments, the spectral data is measured by a spectral detection system, with the spectral sources being part of or components of the spectral detection system. For instance, if the spectral detection system is a scintillator-based fiber dosimeter, some spectral sources could be embodied by the scintillators used in the dosimeter. Additionally, another spectral source could be embodied by another component of the dosimeter, such as the optical fiber used to collect the scintillation light produced by the scintillators and deliver it to a photodetector.

In other embodiments, the spectral detection system includes components that provide multiple spectral sources. For example, in scintillator-based fiber dosimeters, the collection fiber can provide a first one of the spectral sources as a source of fluorescence radiation and a second one of the spectral sources as a source of Cherenkov radiation. In other scenarios, the collection fiber can provide a first one of the spectral sources as a first source of Cherenkov radiation and a second one of the spectral sources as a second source of Cherenkov radiation, which are considered to emit Cherenkov radiation from different locations within the fiber, corresponding to different travel times, and thus different attenuation levels.

In alternative embodiments, the spectral sources can be part of the environment (e.g., a sample or a scene) being analyzed by the spectral detection system. For example, in remote sensing or geological imaging, the spectral sources can correspond to various materials, regions, or components within the sample or scene.

Some spectral sources may produce useful or wanted signals, while others may produce contaminating or unwanted signals. For example, in scintillator-based fiber dosimeters, the scintillation light from the scintillators generally provide useful signals, whereas fluorescence and Cherenkov radiation from the collection fiber are generally considered as contaminating signals.

The method 100 depicted in FIG. 1 includes a step 102 of modeling the spectral data using two matrices to be determined: a current endmember matrix (or simply "endmember matrix") and a current abundance matrix (or simply "abundance matrix"). The endmember matrix is composed of a set of endmember spectra corresponding to the set of spectral sources, while the abundance matrix indicates the proportion of each endmember spectrum in each measured spectrum. In some embodiments, the number of spectral sources can range from 2 to about 10, although the present techniques are not limited to any particular number of spectral sources.

In some embodiments, a linear spectral mixing model can be used to represent the mixed spectral data as a linear combination of endmember spectra, weighed by their respective fractional abundances. For example, a measured spectrum $y_{[L\times1]}$, having L channels, can be expressed mathematically as a linear combination of K endmember spectra $r_{k[L\times1]}$, each multiplied by its abundances $x_k$, with added random noise $n_{[L\times1]}$, as follows:

$$y = \sum_{k=1}^{K} x_k r_k = Rx + n, \quad (1)$$

where $x_{[K\times1]}$ is the abundance vector and $R_{[L\times K]}$ is the endmember matrix. It should be noted that in certain equations presented herein, the subscripts [A×B] indicating matrix and vector dimensions have been omitted for clarity. For M measured spectra, Equation (1) can be generalized as follows:

$$Y = RX + N, \quad (2)$$

where $Y_{[L\times M]}$ is the measurement matrix, with each column representing a single spectral measurement, $R_{[L\times K]}$ is the endmember matrix, $X_{[K\times M]}$ is the abundance matrix, and $N_{[L\times M]}$ is the noise matrix. The linear mixing model generally assumes non-negative abundances whose sum is equal to one. It should be noted that while several embodiments described herein are based on linear spectral unmixing methods, other embodiments can alternatively be implemented using nonlinear spectral unmixing.

Non-negative matrix factorization (NMF) is a category of linear spectral unmixing methods that attempt to solve the unmixing problem by modeling the spectral measurement matrix as the product of two non-negative matrices: an endmember matrix R and an abundance matrix X. That is, given a known non-negative matrix Y, the NMF algorithm aims to find R and X such that:

$$Y \approx RX. \quad (3)$$

NMF techniques seeks to minimize an objective function F(R, X) representing the difference between the known data Y and its approximation RX. In some embodiments, the objective function F(R, X) can be expressed as follows:

$$F(R, X) = \frac{1}{2}\|Y - RX\|^2 = \frac{1}{2}\sum_{l=1}^{L}\sum_{m=1}^{M}(Y_{lm} - (RX)_{lm})^2 \quad (4)$$

where $\|\cdot\|^2$ denotes the Frobenius norm. Other types of norms can be used in other embodiments, such as the Kullback-Leibler divergence or the Itakura-Saito divergence. It should be noted that these three norms are examples of β-divergence objective functions that can based for solving the NMF problem. Typically, a deterministic optimization method, such as a gradient descent method, can be employed to minimize the objective function. In some implementations, the gradient descent can use a multiplicative update rule, which is characterized by an adaptive step size selected so that the update rule, for both R and X, become multiplicative. Multiplicative update rules can balance ease of implementation and speed of convergence.

The NMF algorithm uses initial guesses for the R and X matrices. When no prior knowledge information is available, these matrices can be estimated using singular value decomposition (SVD) methods. Alternatively, the vertex component analysis (VCA) technique can serve as an initialization method for the NMF algorithm. The NMF algorithm can be performed until an end condition is met, such as when the objective function value falls below a specified threshold. It should be noted that while several embodiments described herein use NMF-based spectral unmixing approaches, other embodiments can be based on different categories of spectral unmixing methods, such as matrix factorization without non-negativity constraints or stochastic spectral unmixing.

Referring still FIG. 1, the method 100 includes a step 104 of providing external prior spectral information that includes prior endmember information and prior abundance information. The prior endmember information and the prior abundance information convey at least partial prior knowledge about the endmember matrix and the abundance matrix, respectively. In the present description, "external" prior spectral information refers to prior knowledge about the endmember and abundance matrices that originates from sources other than the mixed spectral data itself, rather than being derived from it. In some instances, the prior endmember information and prior abundance information may be provided as a prior endmember matrix and a prior abundance matrix, respectively. Depending on the application, the prior endmember information may cover the entire endmember matrix or only a subset of its elements, and likewise for the prior abundance information. The external prior spectral information can be derived from modeling data (e.g., analytical or empirical models), experimental data, or both.

In some embodiments, the series of one or more measured optical spectra are acquired under a respective series of one or more current irradiation conditions, and the external prior spectral information corresponds to prior irradiation conditions that are at least partially representative of the current irradiation conditions. For example, step 104 can include experimentally determining the prior endmember information as a prior endmember matrix, which includes a set of prior endmember spectra corresponding to the set of spectral sources. Step 104 can also involve experimentally determining the prior abundance information as a prior abundance matrix using the experimentally determined prior endmember matrix as input. The prior abundance matrix indicates the fraction of each prior endmember spectrum in each prior optical spectrum. In certain cases, determining the prior abundance matrix includes measuring a series of one or more prior optical spectra corresponding to light received from the set of spectral sources (or an equivalent set of spectral sources) under a respective series of one or more prior irradiation conditions that are representative of the series of one or more current irradiation conditions. This is followed by determining the prior abundance matrix from the series of one or more prior optical spectra and the prior endmember matrix.

In some embodiments, trust metrics can be used to indicate the confidence level associated with the prior endmember and/or prior abundance information. For example, element-wise or column/row-wise trust coefficients can be assigned to the elements of the prior endmember matrix and/or the prior abundance matrix.

Referring still to FIG. 1, the method 100 further includes a step 106 of performing a spectral unmixing operation on the spectral data to determine a solution for the current endmember matrix and the current abundance matrix, using the external prior spectral information as input to the spectral unmixing operation. In some embodiments, step 106 can include optimizing an objective function that accounts for the difference between the spectral data to be unmixed and the product of the current endmember matrix and the current abundance matrix to be determined, and that incorporates the external prior spectral information. In some embodiments, optimizing the objective function can include performing a non-negative matrix factorization (NMF) procedure. The objective function may be optimized using a gradient descent method or a hierarchical alternating least squares (HALS) method.

As will be described in greater detail with reference to FIGS. 2 and 3, various aspects and features of the spectral unmixing method 100 depicted in FIG. 1 can be applied to calibrating a spectral detection system.

Figure 2:
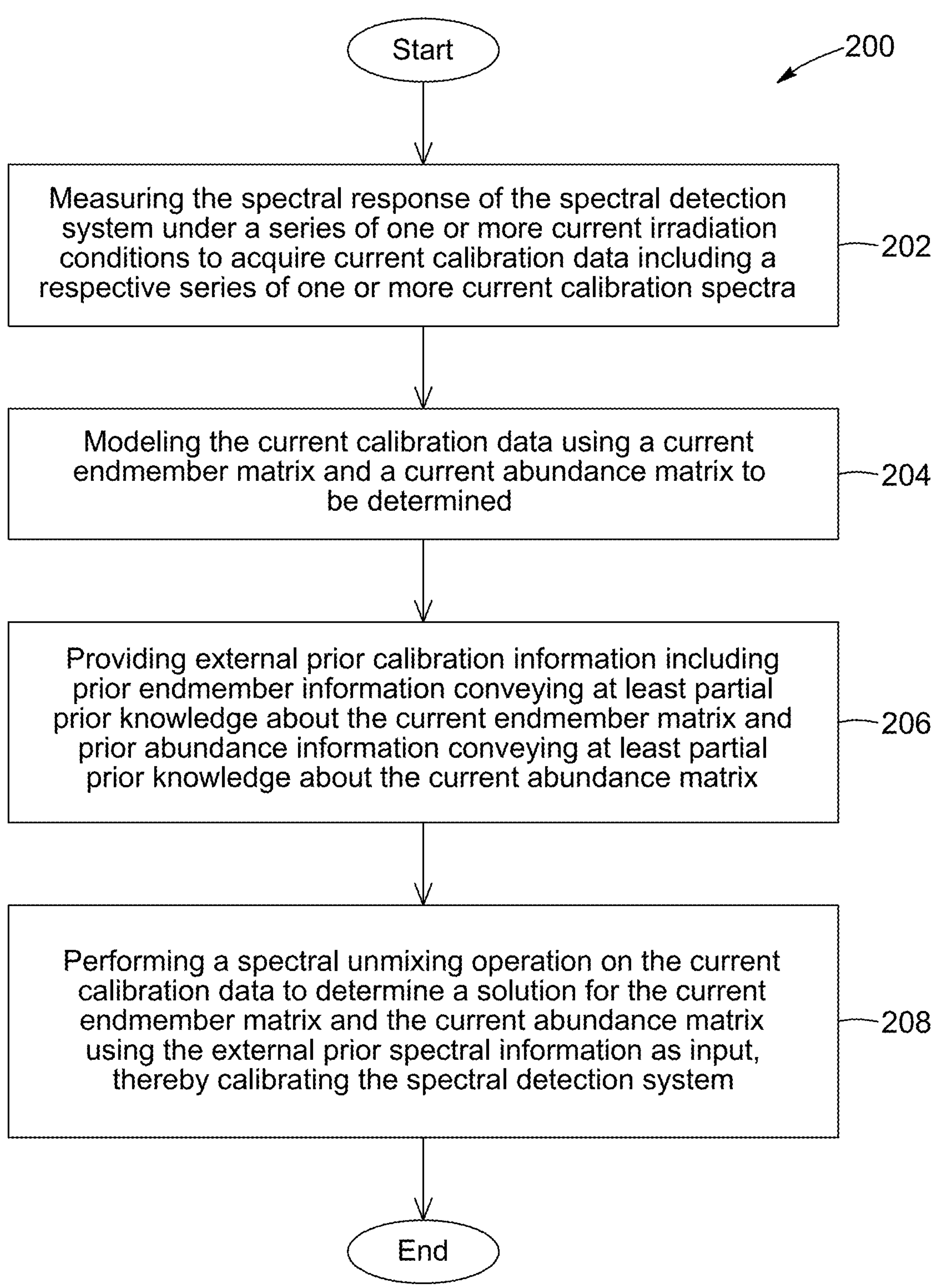
FIG. 2 is a flow diagram illustrating a method for calibrating a spectral detection system, in accordance with an embodiment.

FIG. 2 depicts a flow diagram of an embodiment of a method 200 of calibrating a spectral detection system having a spectral response that includes contributions from a set of spectral sources within the system. These contributions are weighted by the fractional abundances of the spectral sources.

Broadly described, the calibration method 200 (also referred to herein as the "current calibration") includes a step 202 of measuring the spectral response of the spectral detection system under a series of one or more current irradiation conditions to acquire current calibration data including a respective series of one or more current calibration spectra. The method 200 also includes a step 204 of modeling the current calibration data using a current endmember matrix and a current abundance matrix to be determined. The current endmember matrix includes a set of current endmember spectra respectively corresponding to the set of spectral sources, while the current abundance matrix indicates the relative amount or proportion of each current endmember spectrum within the or each current calibration spectrum. The method 200 further includes a step 206 of providing external prior calibration information including prior endmember information and prior abundance information. The prior endmember information conveys at least partial prior knowledge about the current endmember matrix, while the prior abundance information conveys at least partial prior knowledge about the current abundance matrix. The calibration method 200 also includes a step 208 of performing a spectral unmixing operation on the current calibration data using the external prior spectral information as input. This operation aims to find a solution for the current endmember matrix and the current abundance matrix from the current calibration data and the external prior spectral information, and use this solution to calibrate the spectral detection system.

Various aspects, features, and implementations of these and other possible steps of the calibration method 200 are described in greater detail below.

Figure 3:
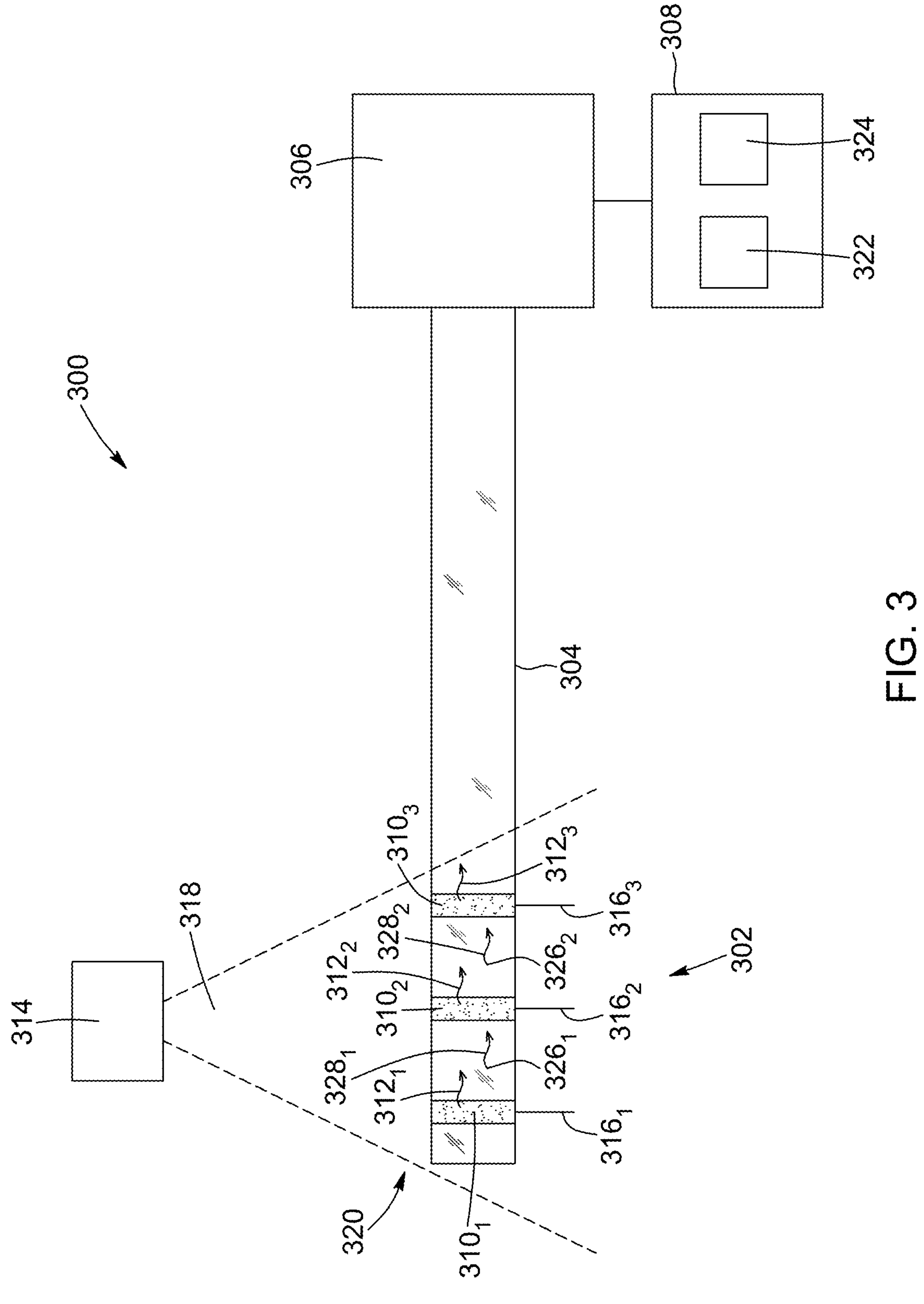
FIG. 3 is a schematic representation of a spectral detection system, which can be calibrated using the method depicted in FIG. 2.

FIG. 3 illustrates an embodiment of a spectral detection system 300 whose spectral response can be calibrated using the calibration method 200 depicted in FIG. 2. Specifically, the spectral detection system 300 shown in FIG. 3 is a radiation dosimeter, namely a multipoint scintillator-based fiber dosimeter that can be used for dose measurements during radiotherapy. However, other types of suitable spectral detection systems, whether implemented as radiation dosimeters or not, can also be calibrated by using the method 200 of FIG. 2. It is also appreciated that while several embodiments of spectral unmixing techniques described below relate to methods of calibrating spectral detection systems, other embodiments can be implemented in other applications, such as measurement-based applications.

The spectral detection system 300 depicted in FIG. 3 generally includes a scintillation unit 302, a collection light guide 304, a spectral detector 306, and a computer device 308. The scintillation unit 302 includes at least one scintillating element $\mathbf{310_1}$-$\mathbf{310_3}$ configured to emit at least one scintillation signal $\mathbf{312_1}$-$\mathbf{312_3}$ in response to irradiation from an irradiation source 314. For the purpose of this embodiment, the scintillating elements $\mathbf{310_1}$-$\mathbf{310_3}$ and scintillation signals $\mathbf{312_1}$-$\mathbf{312_3}$ will be referred to in the plural. The collection light guide 304 is optically coupled to the scintillation unit 302 and is configured to deliver the scintillation signals $\mathbf{312_1}$-$\mathbf{312_3}$ from the scintillating elements $\mathbf{310_1}$-$\mathbf{310_3}$ to the spectral detector 306. The spectral detector 306 is configured to detect the scintillation signals $\mathbf{312_1}$-$\mathbf{312_3}$ received from the collection light guide 304. The computer device 308 is configured to control, monitor, and/or coordinate the functions and operations of various components of, or coupled to, the spectral detection system 300, such as the spectral detector 306 and the irradiation source 314. The computer device 308 is also configured to receive and analyze the spectral data measured by the spectral detector 306, for example, to perform the spectral unmixing method 100 depicted in FIG. 1 or the calibration method 200 depicted in FIG. 2.

The structure, configuration, and operation of these and other possible components of, or coupled to, the spectral detection system 300 are described in greater detail below. It is appreciated that FIG. 3 is a schematic representation intended to illustrate several components and features of the spectral detection system 300, and that additional components and features useful or necessary for its practical operation may not be specifically depicted. In some applications, the spectral detection system 300 can be used with a phantom made of water-equivalent or human-tissue-equivalent materials. In other applications, the spectral detection system 300 may be used without a phantom, for example, while performing in-vivo dosimetry during radiotherapy, with at least part of the system 300 disposed on or inserted into a patient.

It is also appreciated that the theory, instrumentation, implementation, and operation of radiation dosimeters, including scintillation dosimeters and their various types, such as those based on multipoint plastic scintillation detectors, are generally known in the art and need not be described in detail herein, except to facilitate an understanding of the present techniques.

In FIG. 3, the scintillation unit 302 includes three scintillating elements 310$_1$-310$_3$, each having its own scintillation spectrum. Different scintillating elements generally have different scintillation spectra, although this is not a requirement (e.g., if the scintillators are used with different spectral filters). The three scintillating elements 310$_1$-310$_3$ are provided at three different locations 316$_1$-316$_3$ along the collection light guide 304. Such an arrangement enables multi-point dosimetry to be performed using a single collection light guide 304. The collection light guide 304 can be embodied by an optical fiber of any suitable type or another type of light-guiding element. In some embodiments, the collection light guide 304 can have a length ranging from about 5 m to about 50 m. It is appreciated that while the embodiment of FIG. 3 includes three scintillating elements 310$_1$-310$_3$ coupled to a single collection light guide 304, other embodiments can include a different number of scintillating elements (i.e., one, two, or more than three) and collection light guides (i.e., more than one), with various configurations to suit the specific needs or requirements of a given application. Various arrangements of fiber-optic-based scintillation dosimeters are known in the art and can be used for implementing the present techniques.

In some embodiments, the scintillating elements 310$_1$-310$_3$ may have lengths ranging from about 250 μm to about 10 cm, diameters ranging from about 250 μm to about 2 mm, and inter-element separations ranging from nearly 0 cm to about 40 cm. Depending on the application, the scintillating elements 310$_1$-310$_3$ can be made from various organic and inorganic scintillating materials. Examples of organic scintillating materials include plastic scintillators based on polyvinyl toluene (PVT), polystyrene (PS), and poly(methyl methacrylate) (PMMA). Examples of inorganic scintillating materials include NaI, NaI(TI), CsI, CsI(TI), CsI(Na), CsF, $BaF_2$, $CdWO_4$, $Al_2O_3$, BGO, GSO(Ce), YAP(Ce), and LSO (Ce).

In operation, the irradiation source 314 is configured to emit an irradiation beam 318 toward an irradiation zone 320 encompassing the scintillating elements 310$_1$-310$_3$. The irradiation source 314 can be embodied by any device or combination of devices capable of generating an irradiation beam 318 suitable for radiotherapy. Examples include a medical linear accelerator (linac), a brachytherapy source, or an X-ray source. The irradiation beam 318 can be made of various types of ionizing radiation, including electromagnetic radiation (e.g., X-rays or gamma rays) and particle radiation (e.g., electrons, protons, neutrons, or heavy ions). In response to irradiation by the irradiation beam 318, the scintillating elements 310$_1$-310$_3$ generate the scintillation signals 312$_1$-312$_3$ in accordance with their respective scintillation spectra. In scintillator-based radiation dosimetry, the amount of light generated by each of the scintillating elements 310$_1$-310$_3$ is indicative of the radiation dose deposited at each of their respective locations 316$_1$-316$_3$.

The spectral detector 306 is configured to detect the light delivered by the collection light guide 304, which includes the combined scintillation signals 312$_1$-312$_3$ from scintillating elements 310$_1$-310$_3$, as well as potential non-scintillation signals from other spectral sources (e.g., from the collection light guide 304 itself). The spectral detector 306 can be embodied by any optical detector or combination of optical detectors capable of detecting a spectrally dependent response (e.g., as function of frequency or wavelength over multiple channels across a certain spectral range) of an input optical signal. The spectral detector 306 is configured to convert the detected optical signal into an electrical signal, which is then sampled and digitized into spectral data representing the detected input signal. The sampling and digitization process may be performed within the spectral detector 306 itself or within the computer device 308. In the illustrated embodiment, the spectral data is a mixed signal that contains spectral contributions from various spectral sources, including the scintillating elements 310$_1$-310$_3$.

The spectral detector 306 can be embodied by various different types of spectrally sensitive detectors and cameras, including spectrophotometers, optical spectrum analyzers, swept-wavelength systems, hyperspectral imagers, multispectral imagers, or any appropriate type of spectral-sensitive measurement devices. In some embodiments, the spectral detector 306 spatially and spectrally separates the light from the collection light guide 304 into multiple spectral components and directs these components onto a photodetector array configured to generate multiple output signals corresponding to these components. These output signals form the mixed spectral data to be unmixed. Various systems and techniques known for spatially and spectrally separating an input spectral signal into spectral components and measuring these components using a photodetector array can be employed in the present techniques. Such systems and techniques need not be described herein. Additionally, various types of photodetector arrays can be used. Examples include charge-coupled device (CCD) cameras, complementary metal-oxide-semiconductor (CMOS) cameras, charge injection devices, photodiode arrays, photomultiplier tube arrays, and the like. In scintillator-based radiation dosimetry, the spectral detector 306 may be configured to operate in a detection waveband ranging from about 350 nm to about 700 nm, although other spectral regions of the electromagnetic spectrum can also be used.

The computer device 308, which may be implemented in hardware, software, firmware, or any combination thereof, connects to various components of the spectral detection system 300 via wired and/or wireless communication links configured to send and receive signals, such as timing and control signals, measurement signals, and data signals. The computer device 308 may be controlled by direct user input and/or programmed instructions, and may include an operating system for controlling and managing various functions of the spectral detection system 300. Depending on the application, the computer device 308 may be fully or partly integrated with, or physically separate from, the other hardware components of the spectral detection system 300. The computer device 308 can include a processor 322 and a memory 324.

The term "processor" is intended to refer broadly to any electronic device, circuitry, or component capable of processing, receiving, or transmitting data or instructions, such as computer programs, commands, functions, processes, software codes, executables, applications, and the like. Although the processor 322 is depicted in FIG. 3 as a single entity for illustration, the term "processor" encompasses various architectures, including multiple processing units that may be within the same device or distributed across multiples devices interconnected by a communication network. Non-limiting examples for the processor 322 include a general-purpose single- or multi-core processor; a central processing unit (CPU); a microprocessor; a microcontroller; a coprocessor; a controller; a digital signal processor (DSP); a programmable logic device; a field-programmable gate array (FPGA); an application-specific integrated circuit (ASIC); a digital processor or circuit; an analog processor or circuit; or any device configured to electronically process information.

The memory 324, which may also be referred to as a "computer readable storage medium", is configured to store computer programs and data retrievable by the processor 322. Depending on the application, the memory 324 may be separate from or included within the processor 322. In the present description, the terms "computer readable storage medium" and "computer readable memory" are intended to refer to a non-transitory, tangible computer product that can store and communicate executable instructions for the implementation of various steps of the techniques disclosed herein. Although the memory 324 is depicted in FIG. 3 as a single entity for illustration, the term "memory" encompasses various architectures, including multiple memory units that may be within the same device or distributed across multiples devices interconnected by a communication network. The memory 324 may be any computer data storage device or assembly of such devices, including a random-access memory (RAM) of any type; a read-only memory (ROM) of any type; a magnetic storage device; an optical storage device; a solid-state drive (SSD) device, such as a flash drive memory; or any other tangible and/or non-transitory computer readable medium which can be used to store electronic data or information.

Referring still to FIG. 3, in multipoint scintillator-based fiber dosimeters, the scintillation signals $\mathbf{312_1}$-$\mathbf{312_3}$ produced by the scintillating elements $\mathbf{310_1}$-$\mathbf{310_3}$ in response to irradiation by the irradiation source 314 represent the intended or useful signals of the spectral detection system 300. This is because the amount of light generated by each of the scintillating elements $\mathbf{310_1}$-$\mathbf{310_3}$ is indicative of the radiation dose deposited at each of their respective locations $\mathbf{316_1}$-$\mathbf{316_3}$. However, multipoint scintillator-based fiber dosimeters may also produce unwanted or contaminating signals, which add to the scintillation signals $\mathbf{312_1}$-$\mathbf{312_3}$ from the scintillating elements $\mathbf{310_1}$-$\mathbf{310_3}$ detected by the spectral detector 306. A typical source of contaminating signals in multipoint scintillator-based fiber dosimeters is the radiation-induced stem-effect light produced within the optical fiber acting as the collection light guide 304. In some embodiments, the stem-effect spectra can be represented as a linear combination of a fluorescence emission spectrum and a Cherenkov radiation emission spectrum. Cherenkov radiation is emitted when charged particles move through a medium at speeds faster than the speed of light in that medium, and therefore, Cherenkov radiation is only expected to be observed above a certain energy threshold. For example, in the case of PMMA, a fiber-optic material commonly used in fiber dosimeters, the Cherenkov threshold is about 178 keV. Below the Cherenkov threshold, the stem-effect spectrum is expected to be dominated by the fluorescence emission spectrum.

In some embodiments, the collection light guide 304 can act as both an unwanted spectral source $\mathbf{326_1}$ of fluorescence radiation and an unwanted spectral source $\mathbf{326_2}$ of Cherenkov radiation. In such embodiments, the spectral response of the spectral detection system 300, which is to be calibrated, can be modeled as including spectral contributions from two subsets of spectral sources: a first subset of wanted spectral sources and a second subset of unwanted spectral sources. In the illustrated embodiment, the first subset includes the three scintillating spectral sources $\mathbf{310_1}$-$\mathbf{310_3}$, which contribute three scintillation signals $\mathbf{312_1}$-$\mathbf{312_3}$ to the system's spectral response, while the second subset includes two non-scintillating spectral sources $\mathbf{326_1}$-$\mathbf{326_2}$, which contribute two non-scintillation signals $\mathbf{328_1}$-$\mathbf{328_2}$ (i.e., a fluorescence signal $\mathbf{328_1}$ and a Cherenkov signal $\mathbf{328_2}$) to the system's spectral response. However, in other embodiments, different subsets of unwanted spectral sources may be used to account for the stem effect. Examples include (i) a single unwanted spectral source that accounts for both fluorescence and Cherenkov emissions, (ii) a single unwanted spectral source that accounts only for fluorescence emission (e.g., for low-energy implementations), (iii) a single unwanted spectral source that accounts only for Cherenkov emission, (iv) two or more unwanted spectral sources that account for Cherenkov emission at different locations along the collection light guide 104, with or without an additional unwanted spectral source accounting for fluorescence emission.

In some embodiments, the spectral response of the spectral detection system 300 can be modeled as a linear combination of endmember spectra weighed by their fractional abundances. See, for example, Equation (1) for a single measurement of the system's spectral response and Equation (2) for a series of measurements. Specifically, the spectral response of the system 300 depicted in FIG. 3 can be modeled as linear combination of five endmember spectra weighed by their fractional abundances, each spectra corresponding to one of the five spectral sources mentioned above. The first endmember spectrum corresponds to the scintillation spectrum of the first scintillating element $\mathbf{310_1}$ (first spectral source), the second endmember spectrum corresponds to the scintillation spectrum of the second scintillating element $\mathbf{310_2}$ (second spectral source), the third endmember spectrum corresponds to the scintillation spectrum of the third scintillating element $\mathbf{310_3}$ (third spectral source), the fourth endmember spectrum corresponds to the fluorescence spectrum of the first non-scintillating spectral source provided by the collection light guide 104 (fourth spectral source), and the fifth endmember spectrum corresponds to the Cherenkov spectrum of the second non-scintillating spectral source provided by the collection light guide 104 (fifth spectral source).

It is appreciated that delivered radiation doses can be determined from a single measurement of the system's spectral response if the fractional abundance of each spectral source is known. These fractional abundances can be computed using a least-squares algorithm (or another suitable algorithm) if the endmember spectra are known, which requires the system 300 to be calibrated. Calibration of the system 300 typically involves identifying the spectral sources contributing to the system's spectral response (e.g., the five spectral sources $\mathbf{310_1}$-$\mathbf{310_3}$, $\mathbf{326_1}$-$\mathbf{326_2}$ mentioned above), and accurately determining their spectral responses (i.e., the endmember spectra) for precise dose measurements. This calibration can be performed before the system 300 is used for the first time, and then at regular or irregular intervals (e.g., monthly or weekly) to account or compensate for changes that may affect the system's accuracy. For example, endmember spectra may change over time due to aging, radiation-induced factors, or other factors. Calibrating the system's spectral response aims to ensure that any measurement deviations are corrected or accounted for, allowing the system 300 to perform consistently and reproducibly. However, the process of measuring endmember spectra is challenging because acquiring pure spectral measurements for each spectral source under irradiation can be a complex and cumbersome operation. Although specialized equipment and techniques can be used to determine each endmember spectrum experimentally, these techniques are often time-consuming and tedious, which can be disadvantageous in clinical settings desiring or requiring ease of use, high throughput, and efficient time and resource allocation.

To overcome or alleviate these challenges in calibrating spectral detection systems such as scintillator-based fiber dosimeters, the present techniques disclose a calibration method that uses external prior calibration information is provided (see, e.g., FIG. 2, step 206). This external prior calibration information includes prior endmember information and prior abundance information that convey at least partial prior knowledge about the current endmember matrix and the current abundance matrix to be determined from current calibration data (see, e.g., FIG. 2, steps 202 and 204). As noted above with respect to the expression "external prior spectral information", the term "external" in the "external prior calibration information" is intended to refer to prior knowledge about the current endmember and abundance matrices that is obtained or determined from sources other than the current calibration data itself, rather than originating from it. For example, the external prior calibration information can include prior irradiation conditions that are representative of at least part of the series of one or more current irradiation conditions used for the current calibration. Depending on the application, the prior endmember information can include external prior knowledge about all or fewer than all of the elements of the current endmember matrix, and the prior abundance information can include external prior knowledge about all or fewer than all of the elements of the current abundance matrix.

Referring to FIG. 2, in some embodiments, step 206 of providing the external prior calibration information may be part of a process referred to herein as a "prior reference calibration". The prior reference calibration can include two main steps: a first step of determining the prior endmember information and a second step of determining the prior abundance information using the prior endmember information. The prior reference calibration may be performed by the user upon using the system 300 for the first time, or from time to time, as needed or appropriate. In other embodiments, the prior reference calibration can be performed by the system's manufacturer in a factory setting and supplied to the user upon purchase of the system 300 (e.g., in an instruction manual or user guide).

The first step includes experimentally determining the prior endmember information as a prior endmember matrix $R_{prior}$, where $R_{prior}$ includes a set of prior endmember spectra corresponding to the set of spectral sources (e.g., the five spectral sources 310$_1$-310$_3$, 326$_1$-326$_2$ in the embodiment of FIG. 3). As noted above, achieving accurate measurements for each endmember spectrum can be a time-consuming and laborious process, which is generally not intended to be performed routinely in the normal use of the system 300. In some embodiments, this determination can involve performing measurements under various experimental conditions using both megavoltage and kilovoltage radiation sources. These experimental conditions may involve multiple detector positions, radiation field sizes, and radiation field angles.

The second step includes experimentally determining the prior abundance information as a prior abundance matrix $X_{prior}$. This determination can include a first step of measuring a series of one or more prior calibration spectra $Y_{prior}$ corresponding to light received from the set of spectral sources (or an equivalent set of spectral sources) under a respective series of one or more prior irradiation conditions. These conditions should be representative of the one or more current irradiation conditions used during the calibration method 200 (e.g., during step 202). In some embodiments, the number of prior calibration spectra $Y_{prior}$ (and thus the number of prior irradiation conditions) can range from 3 to 30. It should be noted that measuring the series of one or more prior calibration spectra $Y_{prior}$ is typically noticeably faster and simpler compared to the first step of experimentally determining the endmember matrix $R_{prior}$.

In some embodiments, the series of prior irradiation conditions used to obtain the series of prior calibration spectra $Y_{prior}$ can be selected to introduce significant variations in the fractional abundance vector from one prior calibration spectrum to another, thereby ensuring sufficient variability across columns in the prior abundance matrix $X_{prior}$. For example, certain irradiation conditions may be designed to set the fractional abundance of one or more specified spectral endmembers to be close to one or zero, while other irradiation conditions may aim for the fractional abundance of all or a subset of the spectral endmembers to be similar to one another or above a certain threshold. In some embodiments, such diversity in irradiation conditions can be achieved by varying parameters of the irradiation beam 318 produced by the irradiation source 314. Examples of these parameters include energy, fluence, size, position (e.g., to selectively irradiate one or more of the scintillating elements 310$_1$-310$_3$), and angle.

The determination of the prior abundance matrix $X_{prior}$ can include a second step of deriving the prior abundance matrix $X_{prior}$ from the series of one or more prior calibration spectra $Y_{prior}$ and the prior endmember matrix $R_{prior}$. The prior abundance matrix $X_{prior}$ specifies the relative amount or proportion of each prior endmember spectrum in each prior calibration spectrum. In some embodiments, the prior abundance matrix can be obtained from $R_{prior}$ and $Y_{prior}$ using a least-squares algorithm (or another suitable algorithm), as follows:

$$X_{prior} = R^{+}_{prior} Y_{prior}, \tag{5}$$

where $$R^{+}_{prior}$$

denotes the left-inverse matrix of $R_{prior}$.

Once the prior reference calibration is completed, the prior endmember matrix $R_{prior}$ and the prior abundance matrix $X_{prior}$ can be stored as external prior calibration information on a suitable medium (e.g., the memory 324) for later use. This external prior calibration information can be accessed and retrieved (e.g., by the processor 322) at a later time, such as when performing the calibration method 200 shown FIG. 2.

It is appreciated that by using the prior endmember matrix $R_{prior}$ and the prior abundance matrix $X_{prior}$ as prior knowledge information, the calibration method 200 can be made faster and simpler than the prior reference calibration, as it can avoid the often lengthy and arduous process of experimentally determining the endmember spectra. For example, in some embodiments, step 202 of acquiring the current calibration data by measuring the spectral response of the spectral detection system 300 can simply include measuring a series of one or more current calibration spectra Y under a series of current irradiation conditions that match at least partially the series of one or more prior irradiation conditions used to measure the series of one or more prior calibration spectra $Y_{prior}$ during the prior reference calibration.

In some embodiments, the prior irradiation conditions can guide the user in selecting or adjusting the current irradiation conditions to be at least partially representative of the prior irradiation conditions. In some embodiments, step 202 of measuring the current calibration spectra Y can follow a detailed step-by-step irradiation protocol to ensure that the corresponding current irradiation conditions closely match the prior irradiation conditions used to obtain the prior calibration spectra $Y_{prior}$. In other embodiments, step 202 of measuring the series of current calibration spectra Y can be less stringent and follow general guidelines to achieve current irradiation conditions reproducing or approaching the prior irradiation conditions.

Once step 202 of measuring the series of current calibration spectra Y is completed, the method 200 can proceed with step 204 of modeling the series of current calibration spectra Y in terms of a current endmember matrix R and a current abundance matrix X that are to be determined, such that Y=RX. See, for example, Equation (3) above. The current endmember matrix R is composed of a set of current endmember spectra respectively corresponding to the set of spectral sources, while the current abundance matrix X indicates the abundance of each current endmember spectrum in each calibration spectrum. Determining the current endmember matrix R and the current abundance matrix X from the series of current calibration spectra Y can be carried out in step 208 by performing a spectral unmixing operation on the series of current calibration spectra Y using the prior endmember matrix $R_{prior}$ and the prior abundance matrix $X_{prior}$ obtained at step 206 as input. The spectral unmixing operation is performed to determine a solution for R and X, where the solution for R provides the calibration of the system 300. This means that once R has been obtained, the system 300 is calibrated and can be used for performing dose measurements.

In some embodiments, the solution for the current endmember matrix R and/or the current abundance matrix Y can be used as the external prior calibration information $R_{prior}$ and $X_{prior}$ in a subsequent implementation of the calibration method.

In some embodiments, step 208 of performing the spectral unmixing operation includes the optimization of an objective function. In some embodiments, the objective function (i) relates a difference between the current calibration data Y and a product of the matrices R and X to be determined, and (ii) incorporates the external prior spectral information $R_{prior}$ and $X_{prior}$.

In the example presented below, the spectral unmixing operation includes an NMF-based procedure in which the objective function can be derived from a Bayesian viewpoint. According to Bayes' theorem, the spectral unmixing problem can be formulated as:

$$P(R, X \mid Y) = \frac{P(Y \mid R, X)P(R)P(X)}{P(Y)} \tag{6}$$

where P(R, X|Y) is the joint posterior probability density to be optimized to find the best estimators for the R and X matrices, and P(Y|R, X) is the likelihood function depending on the spectral measurements Y given the endmember matrix R and the abundance matrix X. The prior knowledge information on the endmembers, $R_{prior}$, and on the abundances, $X_{prior}$ can be included in the distributions P(R) and P(X), respectively.

In some embodiments, the likelihood function can be expressed as Gaussian distribution as follows:

$$P(Y \mid R, X) = \frac{1}{\sqrt{(2\pi\sigma^2)^{LM}}} \exp\left[\frac{-\|Y - RX\|^2}{2\sigma^2}\right] \tag{7}$$

where $\|\cdot\|^2$ denotes the Frobenius norm, L is the number of channels for each measurement, and M is the number of measurements, as noted above. The distribution reaches its maximum as the Euclidian distance between Y and RX is minimized.

In some embodiments, multivariate Gaussian functions centered at $R_{prior}$ and $X_{prior}$ can be used to define the distributions P(R) and P(X), respectively, yielding:

$$P(R) = \frac{1}{\sqrt{(2\pi)^{LK}\left|\sum_R\right|}} \exp\left[\frac{-\left\|(R - R_{prior})\sum_R^{-\frac{1}{2}}\right\|^2}{2}\right] \tag{8}$$

and $$P(X) = \frac{1}{\sqrt{(2\pi)^{KM}\left|\sum_X\right|}} \exp\left[\frac{-\left\|(X - X_{prior})\sum_X^{-\frac{1}{2}}\right\|^2}{2}\right]. \tag{9}$$

Assuming that the K endmembers are independent from one another and identically distributed, $\Sigma_R$ can be expressed as a diagonal matrix that contains the uncertainty associated with the prior knowledge on each endmember. In this case, one can define matrix $A^2$ as follows:

$$A^2_{[K\times K]} = \sum_R^{-1} = \begin{pmatrix} \alpha_1^2 & \dots & 0 \\ \vdots & \ddots & \vdots \\ 0 & \dots & \alpha_K^2 \end{pmatrix}, \tag{10}$$

where the coefficients $$\alpha_k^2$$

can be referred to as the trust coefficients on the prior endmember information.

Depending on the level of confidence given to the prior endmember information associated with the $k^{th}$ endmember in $R_{prior}$, the value of $$\alpha_k^2$$

can be varied or adjusted accordingly, where a low value represents low confidence and a high value represents high confidence. Similarly, one can define matrix $B^2$ as follows:

$$B^2_{[M\times M]} = \sum\nolimits_X^{-1} = \begin{pmatrix} \beta_1^2 & \dots & 0 \\ \vdots & \ddots & \vdots \\ 0 & \dots & \beta_M^2 \end{pmatrix}, \tag{11}$$

where the coefficients $$\beta_m^2$$

can be referred to as the trust coefficients on the prior abundance information. Depending on the level of confidence given to the prior abundance information associated with the $m^{th}$ measurement in $X_{prior}$, the value of $$\beta_m^2$$

can be varied or adjusted accordingly, where a low value represents low confidence and a high value represents high confidence.

Substituting Equations (7) to (11) in Equation (6), taking the logarithm on both sides of the resulting expression, and neglecting the constant term yield the following objective function F(R, X), with $\tau^2=1$:

$$F(R, X) = \frac{1}{2}\|Y - RX\|^2 + \frac{1}{2}\|(R - R_{prior})A\|^2 + \frac{1}{2}\|(X - X_{prior})B\|^2. \tag{12}$$

In some embodiments, this objective function F(R, X) can be optimized using a deterministic gradient descent or a HALS algorithm. However, other approaches can be used in other embodiments, for example, a Broyden-Fletcher-Goldfarb-Shanno (BFGS) algorithm or a stochastic gradient descent. The gradient of the objective function F(R, X) of Equation (12) can be expressed as follows:

$$\nabla F(R, X) = \left[\frac{\partial F(R, X)}{\partial R_{11}}, \dots, \frac{\partial F(R, X)}{\partial R_{LK}}, \frac{\partial F(R, X)}{\partial X_{11}}, \dots, \frac{\partial F(R, X)}{\partial X_{KM}}\right], \tag{13}$$

where the terms $$\frac{\partial F(R, X)}{\partial R_{lk}}$$

and $$\frac{\partial F(R, X)}{\partial X_{km}}$$

respectively correspond to the elements of the following matrices:

$$\frac{\partial F(R, X)}{\partial R} = -YX^T + RXX^T + [R - R_{prior}]A^2 \tag{14}$$

and $$\frac{\partial F(R, X)}{\partial X} = -R^T Y + R^T RX + [X - X_{prior}]B^2. \tag{15}$$

In some embodiments, the gradient descent can be performed by updating R and X simultaneously, although this is not a requirement. In some embodiments, the following update rules can be used:

$$R_{lk}^{(n+1)} = R_{lk}^{(n)} - \gamma_{lk}\frac{\partial F(R, X)}{\partial R_{lk}} \tag{16}$$

and $$X_{km}^{(n+1)} = X_{km}^{(n)} - \gamma_{km}\frac{\partial F(R, X)}{\partial X_{km}}, \tag{17}$$

where $\gamma_{lk}$ and $\gamma_{km}$ are the step sizes of the gradient descent. It should be noted that various other update rules can be used in other embodiments. Additionally, neither $R_{prior}$ nor $X_{prior}$ has to be fully defined before applying the method, since any missing information can be accounted for by setting $$\alpha_k^2 \text{ or } \beta_m^2$$

equal to zero for the corresponding endmember or measurement in matrix $A^2$ or $B^2$.

Depending on the implementation, the step sizes in Equations (16) and (17) can be chosen in order to get a multiplicative update rule algorithm (MUR) algorithm or a HALS algorithm.

In the case of a MUR algorithm, the following exemplary step sizes can be used:

$$\gamma_{lk} = \frac{R_{lk}^{(n)}}{(RXX^T)_{lk}^{(n)} + \alpha_k^2 R_{lk}^{(n)}} \tag{18}$$

and $$\gamma_{km} = \frac{X_{km}^{(n)}}{(R^T RX)_{km}^{(n)} + \beta_m^2 X_{km}^{(n)}}. \tag{19}$$

To prove the non-increasing property of the MUR algorithm, the following non-increasing criteria can be applied for both update rules, for a given vector v:

$$v^T(D_R - \mathcal{H}_R[F(R, X)])v = v^T S_R v \geq 0, \tag{20}$$

$$v^T(D_X - \mathcal{H}_X[F(R, X)])v = v^T S_X v \geq 0, \tag{21}$$

where matrix $D_R$ is a diagonal matrix having the elements $d_{lk}=1/\gamma_{lk}$ on its diagonal, matrix $D_X$ is a diagonal matrix having the elements $d_{km}=1/\gamma_{km}$ on its diagonal, and matrices $\mathcal{H}_R$[F(R, X)] and $\mathcal{H}_R$[F(R, X)] are the Hessian matrices of F(R, X) for a constant X and for a constant R, respectively:

$$\mathcal{H}_R[F(R, X)] = \begin{pmatrix} \mathcal{R} & \dots & 0_{[K\times K]} \\ \vdots & \ddots & \vdots \\ 0_{[K\times K]} & \dots & \mathcal{R} \end{pmatrix}, \tag{22}$$

$$\mathcal{H}_X[F(R, X)] = \begin{pmatrix} \mathcal{X}_1 & \dots & 0_{[K\times K]} \\ \vdots & \ddots & \vdots \\ 0_{[K\times K]} & \dots & \mathcal{X}_M \end{pmatrix}, \tag{23}$$

where the sub-matrices on the diagonal are given by $$\mathcal{R} = XX^T + A^2, \tag{24}$$

$$\mathcal{X} = R^T R + \beta_m^2 I_{[K\times K]}, \tag{25}$$

and $I_{[K\times K]}$ is the identity matrix of size K×K.

It is possible to prove that $S_R$ and $S_X$ are positive semi-definite for the chosen step size by evaluating the positive semi-definitiveness of the matrices $U_R S_R U_R$ and $U_X S_X U_X$, where $U_R$ and $U_X$ are diagonal matrices having respectively the elements $R_{lk}$ and $X_{km}$ on their diagonal.

It is appreciated that if matrices $U_R S_R U_R$ and $U_R$ are Hermitian diagonally dominant matrices with real non-negative entries on their diagonal, they are therefore positive semi-definite, which implies that $S_R$ is also positive semi-definite. The same reasoning applies to $S_X$. By assuming that R and X are non-negative matrices, it is readily seen that $U_R$ and $U_X$ are positive semi-definite.

In the case of $U_R S_R U_R$ and $U_X S_X U_X$, it is straightforward to see that $U_R S_R U_R = (U_R S_R U_R)^T$ and that $U_X S_X U_X = (U_X S_X U_X)^T$, and therefore, that the matrices are Hermitian. The elements on their diagonal are given by:

$$U_R S_R U_R\colon \sum_{k'\neq k} \left(XX^T\right)_{kk'} R_{lk} R_{lk'} \geq 0, \tag{26}$$

$$U_X S_X U_X\colon \sum_{k'\neq k} \left(R^T R\right)_{kk'} X_{k'm} X_{km} \geq 0, \tag{27}$$

which are equal to the sum of the magnitudes of the non-diagonal entries for a given row, making these matrices diagonally dominant as well. These conditions are always true because the entries of R and X must be positive. Therefore, $S_R$ and $S_X$ are positive semi-definite, and the gradient descent will not diverge for R and X in such embodiments.

In the case a HALS algorithm, the step size of the gradient descent is defined as follows:

$$\gamma_{lk} = \frac{1}{\left(XX^T\right)_{kk} + \alpha_k^2}, \tag{28}$$

$$\gamma_{km} = \frac{1}{\left(R^T R\right)_{kk} + \beta_m^2}. \tag{29}$$

Examples & Experimentation

Various aspects of the present techniques were tested in a study using simulated and measured data obtained in the context of radiation dosimetry, as reported in the following article, the entire contents of which are incorporated herein by reference: B. Lessard et al., "Non-negative Matrix Factorization using Partial Prior Knowledge for Radiation Dosimetry", arXiv:2309.09360 (submitted on Sep. 17, 2023, revised Jun. 14, 2024) (available at https://arxiv.org/abs/2309.09360). It will be appreciated the systems, materials, and associated methods described hereinbelow may have a number of optional features, variations, and applications. The following description of experimentation and results is provided to illustrate further aspects and features of the present disclosure, but should not be construed as limiting their scope. The embodiments and implementations of the present techniques used in the study are based on an NMF approach referred to herein as the NMF-PEAK technique or approach, where "PEAK" stands for "Partial Endmember-Abundance Knowledge".

Figure 4:
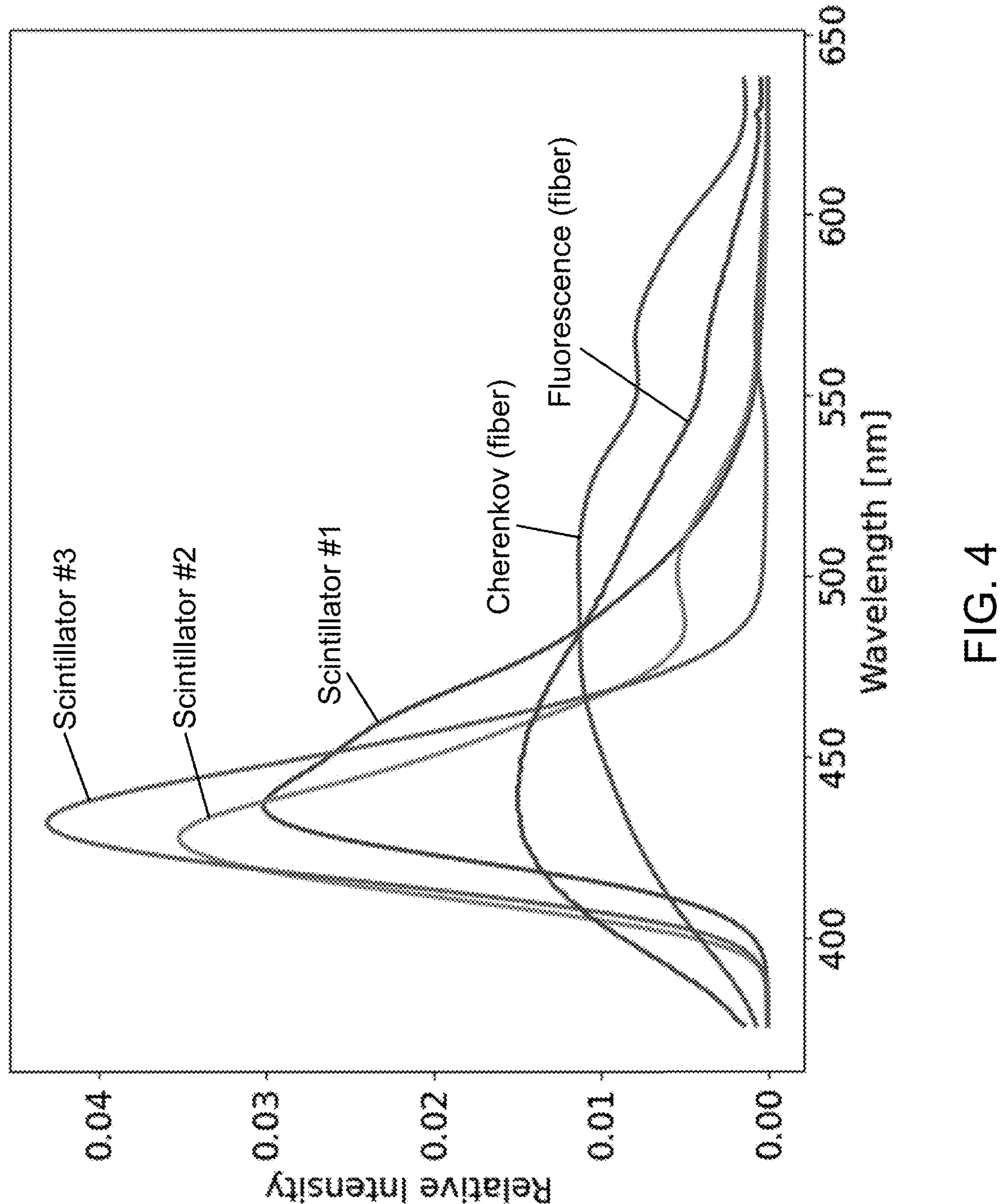
FIG. 4 is graph showing five endmember spectra measured with a three-point plastic scintillation dosimeter in a study implementing aspects of the spectral unmixing techniques disclosed herein.
Figure 5:
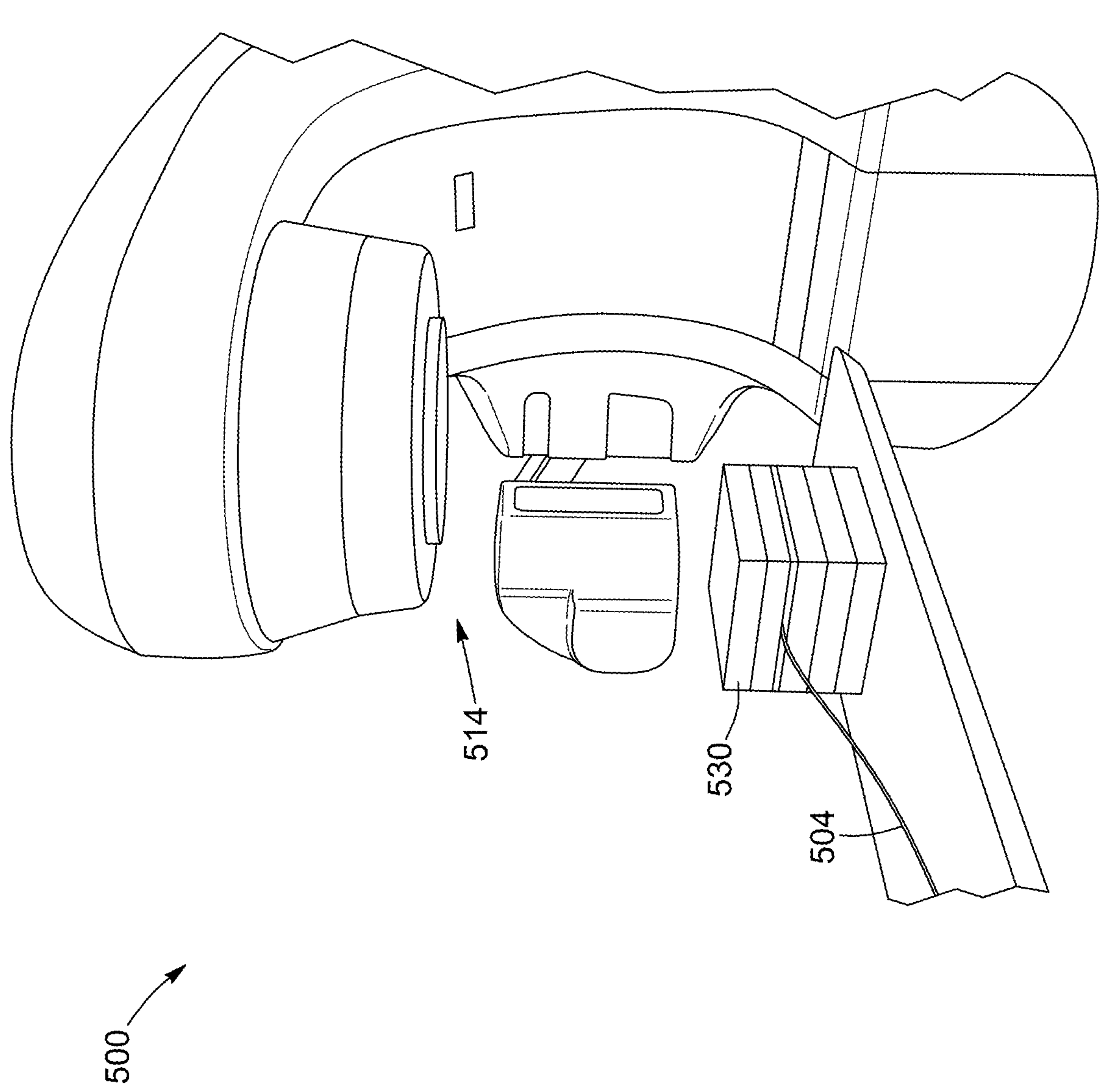
FIG. 5 is a schematic representation of the experimental setup used in the study.

A. Data Acquisition. The radiation dosimeter used in the study was a three-point plastic scintillation dosimeter, capable of performing simultaneous dose measurements at three different locations. The measured spectral data included five endmembers: three scintillator endmembers corresponding to the three scintillators at the three measurement locations, and two contaminating endmembers corresponding to fluorescence and Cherenkov radiation produced by the stem effect inside the optical fiber used to collect the scintillator light. The five endmember spectra are depicted in FIG. 4, where the spectra have been normalized by the intensity under the curve. The experimental setup 500 is shown in FIG. 5. The scintillators were contained inside a solid water phantom 530, and their scintillation signals were collected by an optical fiber 504 and directed to the photodetector of an acquisition system.

Figure 6:
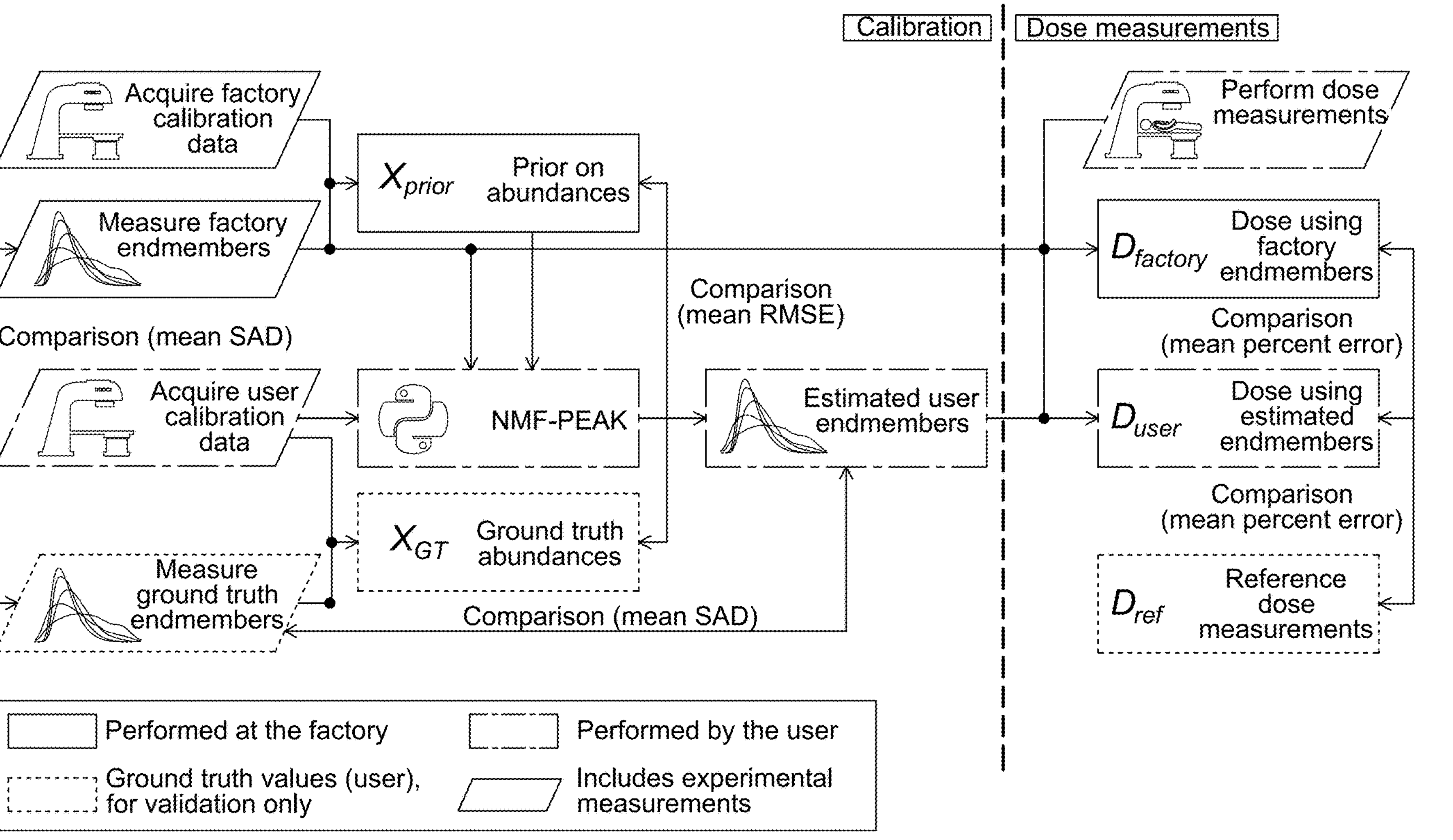
FIG. 6 is a block diagram representing the experimental process applied in the study.

To experimentally determine four of the five endmembers, the X-ray tube of a linac 514 was used to generate a low-energy radiation beam below the threshold for producing Cherenkov radiation. This allowed each scintillator endmember to be obtained almost independently from the others. The Cherenkov spectrum was obtained by irradiating the dosimeter with a 6-MV photon beam delivered by the linac 514 under conditions that maximized and then minimized its collection. The Cherenkov spectrum was derived by subtracting these two measurements. The calibration routine involved using the linac 514 to irradiate the dosimeter inside the solid water phantom 530 with a 6-MV photon beam using several beam configurations to vary the proportion of light emitted by each endmember. Before assembly, the three scintillators were coupled to three independent fibers, creating three independent probes, each emitting up to three endmembers. The collection fibers used for these three independent probes are the same as the ones used for the multi-point detector. The same endmember spectra measurement and calibration routine process was performed with these three independent detectors. These measurements were used to determine the prior endmembers and prior abundances for the simple calibration routine performed later with the multi-point detector. FIG. 6 is a schematic diagram representing the various steps carried out in the study.

The three independent detectors allowed for directed measurement of the endmembers, referred to herein as the factory endmembers (first series of measurements). An average of the three detectors was taken for the fluorescence and Cherenkov endmembers. The factory endmembers were used as the prior endmembers $R_{prior}$ in the NMF-PEAK-based spectral unmixing process. The calibration routine was carried out with each independent detector to obtain the factory calibration data $Y_{prior}$, which, together with the factory endmembers $R_{prior}$, was used to obtain the prior abundances $X_{prior}$ (i.e., using $$X_{prior} = R_{prior}^{+} Y_{prior};$$

see Equation (5) above).

The calibration routine was repeated with the multi-point detector obtain the user calibration data. This data represents the test spectral data that was spectrally unmixed using the NMF-PEAK spectral unmixing process to retrieve the endmembers that changed since the first series of measurements, referred to herein as the estimated user endmembers. The ground truth endmembers were also directly measured and correspond to the "true" experimental endmembers against which the estimated user members were compared to assess the performance of the spectral unmixing process. The ground truth endmembers, along with the user calibration data, were used to obtain the ground truth abundances, which differed from the prior abundances. Independent dose measurements were carried out by irradiating all or a few scintillators to verify the precision and accuracy of the calibration on relative dose measurements. The ground truth dose measurements were computed using the ground truth endmembers directly measured during the second series of measurements.

B. Validation and Optimization of Spectral Unmixing Techniques Using Simulated Data. Simulations based on the experimental calibration method were conducted to verify the roles of the two coefficients that weigh the importance of the prior endmember and abundance information in the objective function of the spectral unmixing method. The simulations also aimed to evaluate the performances of the method. The five experimentally measured endmembers were smoothed using a fast Fourier transform (FTT) filter, and eighteen factory and user calibration data with varying abundances were generated using these endmembers. A comparison between the MUR and HALS algorithms was conducted to determine the most efficient update rule. Additionally, the effect of matrix $B^2$ in the objective function of the NMF-PEAK technique was studied to demonstrate its usefulness for calibrating mPSDs. The effect of matrix $A^2$ was also examined in a case where one of the endmembers had very small abundance values in the factory and user calibration datasets, a common occurrence with mPSDs.

To evaluate the capabilities and performance of the disclosed spectral unmixing method in calibrating mPSDs, the estimated user endmembers $r_k$ obtained by the NMF-PEAK technique were compared to the expected ground truth endmembers $r_{k,0}$ using the spectral angle distance (SAD), defined as:

$$SAD_k = \arccos\left(\frac{r_k \cdot r_{k,0}}{\|r_k\|\|r_{k,0}\|}\right). \tag{30}$$

To evaluate the average performance of the spectral unmixing method, the mean SAD was computed as the mean of the SADs of the K endmembers:

$$\overline{SAD} = \frac{1}{K}\sum_{1=k}^{K} SAD_k. \tag{31}$$

The metric used for comparing the estimated abundance $x_k$ and the expected ground truth abundance $x_{k,0}$, for the $k^{th}$ endmember, was the root-mean-square error (RMSE), defined as:

$$\mathrm{RMS}E_k = \sqrt{\frac{1}{M}|x_k - x_{k,0}|^2}, \tag{32}$$

where $x_k$ is the abundance vector of size [M×1] for the $k^{th}$ endmember. The mean RMSE for K endmembers was computed as follows:

$$\overline{\mathrm{RMS}E} = \frac{1}{K}\sum_{1=k}^{K} \mathrm{RMS}E_k. \tag{33}$$

For experimental validation, the accuracy of dose measurements performed by the detector's scintillators was evaluated by the mean percent error, defined as:

$$\delta D_k = \frac{1}{M}\sum_{m=1}^{M}\left(\frac{D_{km}}{D_{ref}} - 1\right)\cdot 100. \tag{34}$$

1) Comparison Between Update Rules. Both the MUR and HALS update rules were studied using simulated data for both the NMF-PEAK technique and a conventional NMF technique. FIG. 7 shows the number of iterations required for convergence of the algorithm in each scenario. For the NMF-PEAK technique, the eighteen calibration measurements were generated randomly to create the factory and the user calibration data. To generate the ground truth abundances and their corresponding spectral measurements, the abundances for the eighteen calibration measurements were sampled randomly from a uniform distribution in a range from 0 to 0.90 for every endmember, except for the fluorescence spectrum, referred to as the least present endmember, for which the range of possible abundances was 0 to 0.05. Additionally, for each endmember, at least one measurement in the dataset was forced to have the maximum abundance value. The abundances were also chosen so that the sum of all abundances for each measurement was equal to one. This ground truth abundance matrix was used to generate plausible spectral measurements together with the ground truth endmembers, with Poisson noise added to the spectral measurements. The prior abundance matrix was generated from the ground truth abundance matrix, resulting in a prior abundance matrix having a mean RMSE of approximately 0.0810 with the ground truth abundance matrix. The algorithm was applied with all $$\beta_m^2 = 1.$$

The prior fluorescence spectrum was generated from the ground truth fluorescence spectrum, with a mean SAD of 0.0755 with the ground truth fluorescence spectrum. The algorithm was applied with $$\alpha_k^2 = 1$$

for this spectrum and $$\alpha_k^2 = 0$$

for the other endmembers.

Figures 7A, 7B:
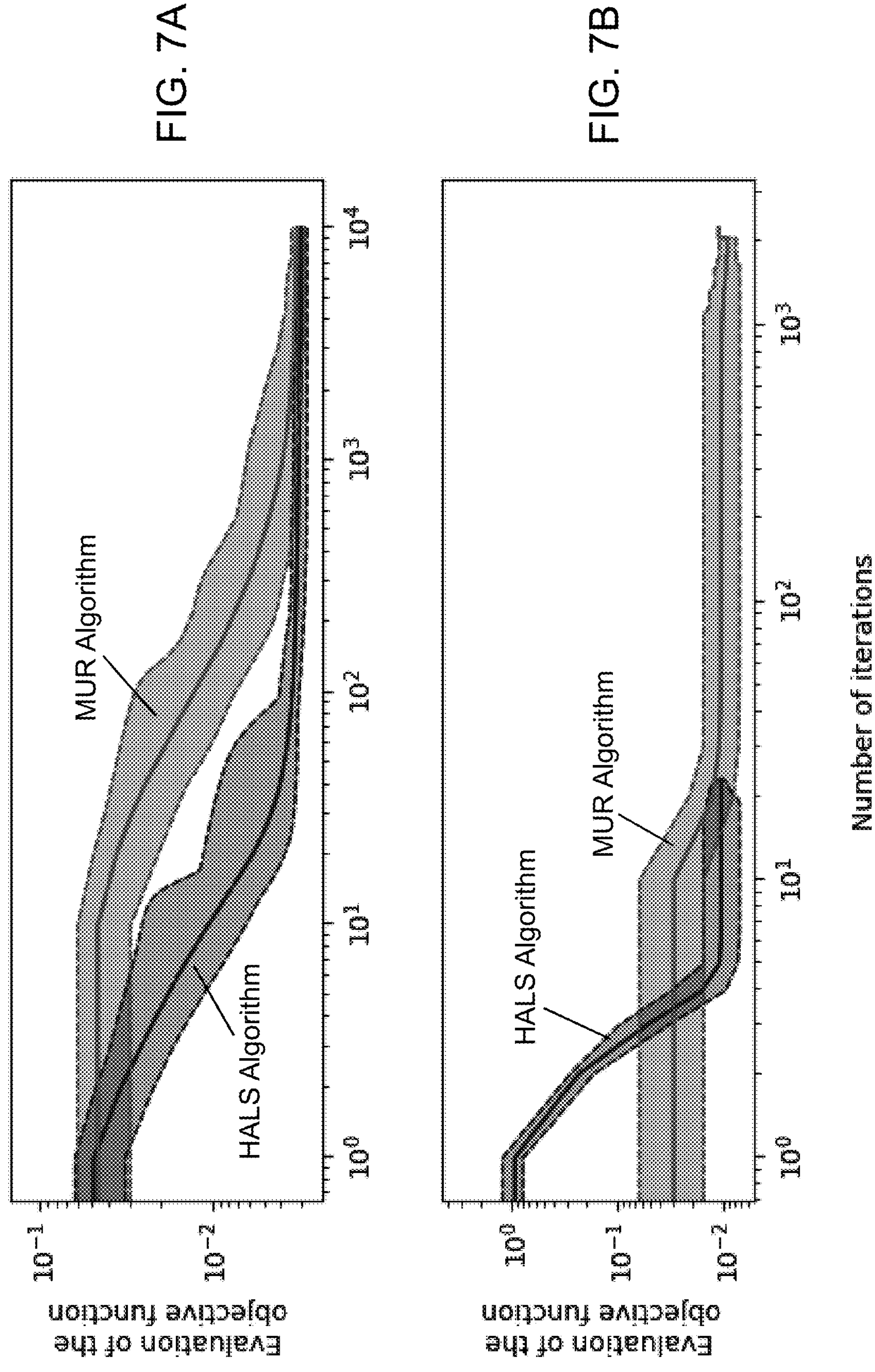
FIGS. 7A and 7B are graphs showing the convergence behavior of the objection function used in an NMF-based embodiment of a spectral unmixing method (FIG. 7A) and a conventional NMF-based spectral unmixing method (FIG. 7B), within the context of the study.

For the NMF-PEAK technique, FIG. 7A shows that while the HALS and the MUR algorithms led achieved similar objective function values, the HALS algorithm converged faster than the MUR algorithm with fewer iterations. Because of its faster convergence, only the HALS algorithm was used for the remainder of the study. In contrast, FIG. 7B shows that standard NMF technique did not converge after 104 iterations, corresponding to the maximum number of iterations allowed by the algorithm.

Figure 8:
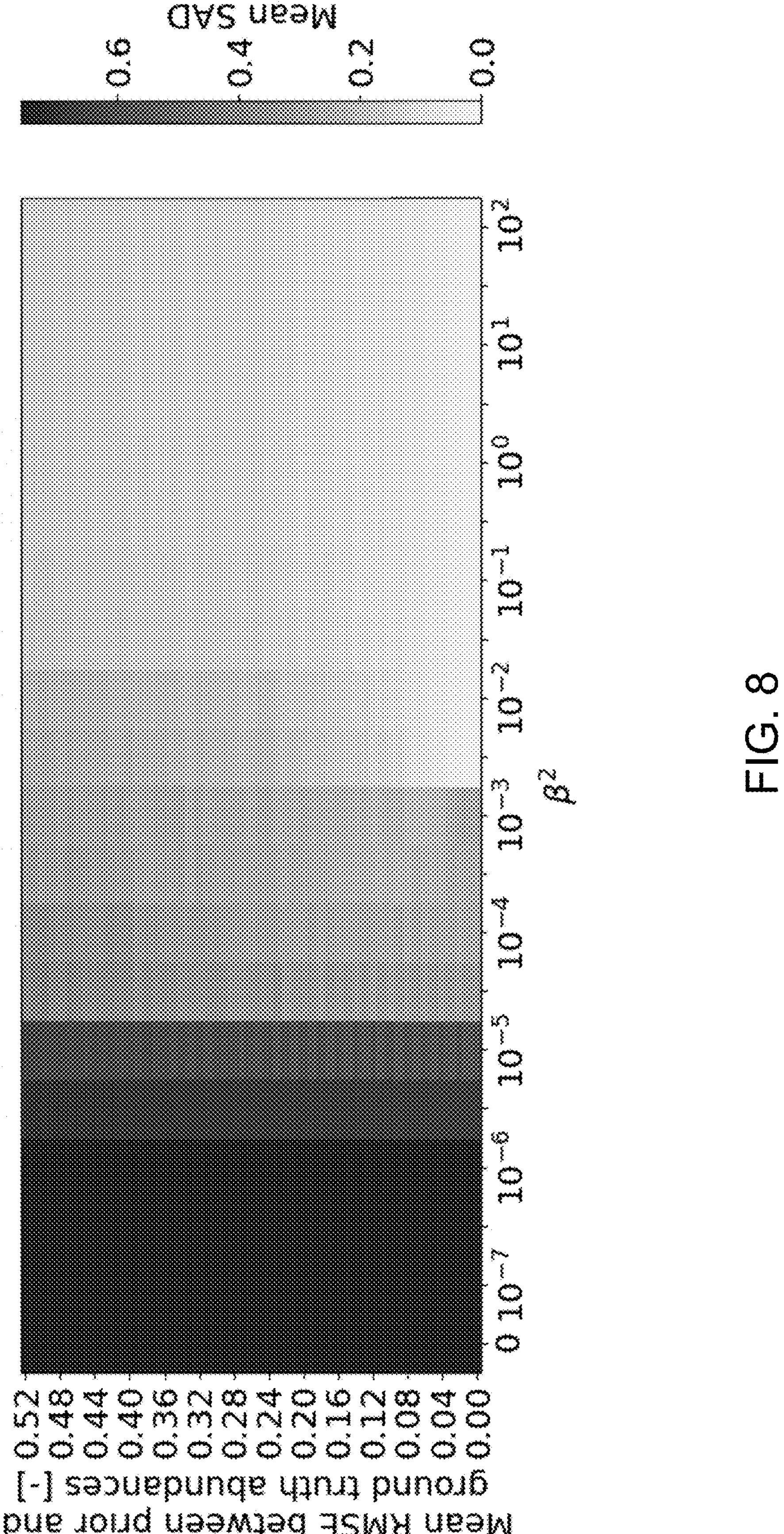
FIG. 8 is contour plot showing the mean spectral angle distance (SAD) between the expected and estimated spectra using an NMF-based embodiment of a spectral unmixing method for different values of the trust coefficient 62 and different root-mean-square error (RMSE) values between the prior abundances and the ground truth abundances.

2) Effect of the Prior Abundance Information. The study investigated the effect of the $B^2$ matrix, which weighs the confidence level on the prior abundance information in the NMF-PEAK objective function (see, e.g., Equation (12)). For a single simulation, the ground truth abundance matrix and eighteen spectral measurements were generated using previously described method. For a constant abundance matrix and constant spectral measurements, multiple prior abundance matrices were generated, resulting in a mean RMSE ranging from approximately 0 to 0.52 with the ground truth abundance matrix. Each generated prior abundance matrix was tested with the NMF-PEAK algorithm using $A^2=0$ and $B^2=\beta^2 I$, with $\beta^2$ values ranging from 0 to 100. This process was repeated 100 times, and the mean SAD between the ground truth and estimated endmembers with the NMF-PEAK algorithm is shown in FIG. 8. Notably, for 62=0, the NMF-PEAK technique yielded results comparable to the conventional NMF technique, resulting in the largest SAD. As 62 increased, the SAD initially decreased slowly, underwent a significant drop around $\beta^2=5.5\times10^{-5}$, and then decreased very slowly with further increases in $\beta^2$. The mean SAD increased when the RMSE increased because the prior abundances were further from the real abundances. However, even for large deviations, there was no significant SAD increase with increasing $\beta^2$. This highlighted that even moderately accurate prior abundance information could enhance the NMF-PEAK algorithm's capabilities to converge to better solutions compared to scenarios without such information. This finding demonstrated the utility and advantages of using prior abundance information for calibrating spectral detection systems such as mPSDs. Notably, using only prior abundance information (i.e., without prior endmember information) significantly improved results with the NMF-PEAK approach compared to conventional NMF techniques, provided that the prior abundance information was an accurate representation of reality.

Figure 9A:
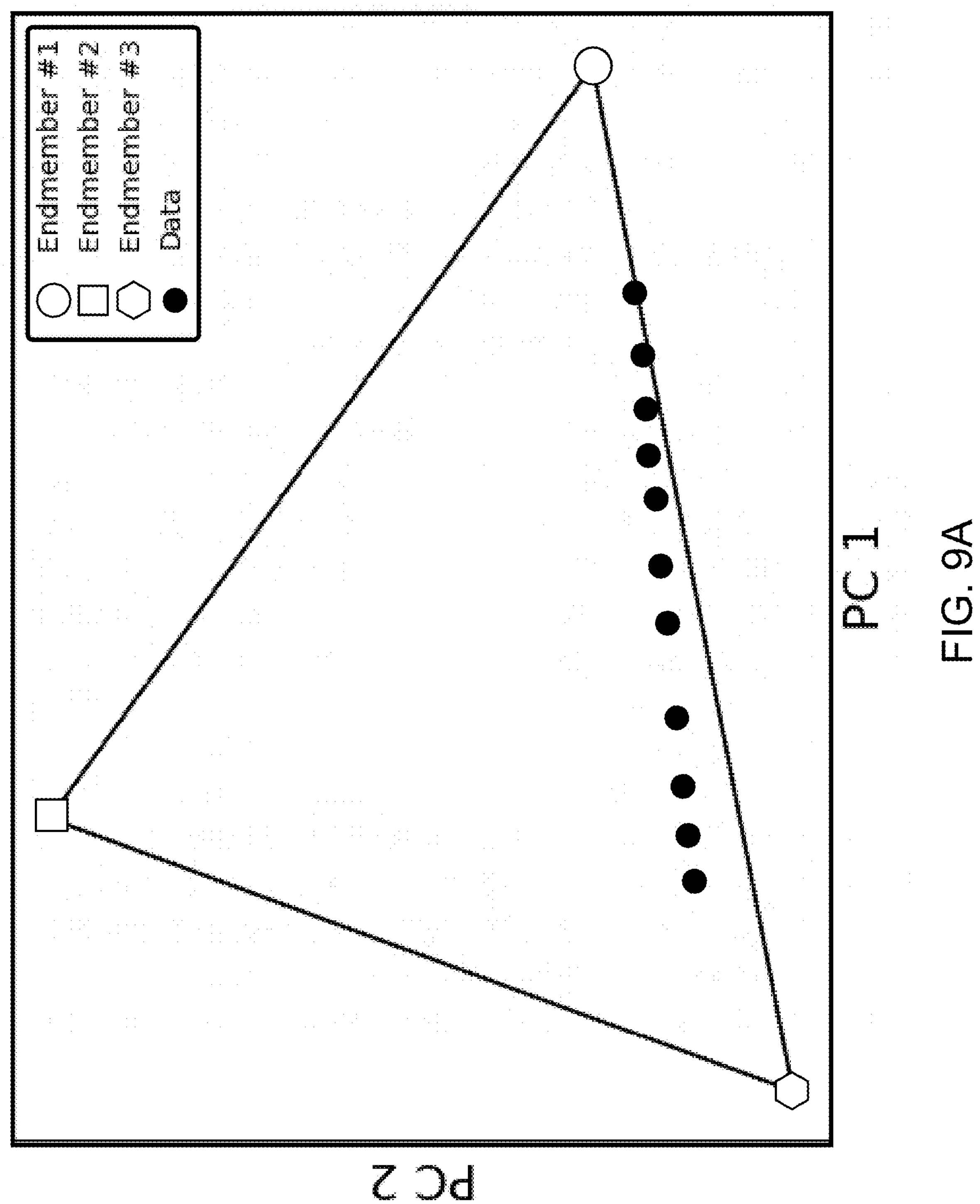
FIG. 9A shows a principal component analysis (PCA) conducted in the study, applied to a calibration dataset where one of the endmembers had significantly lower abundance compared to the others.

3) Effect of the Prior Endmember Information. It was observed that using prior abundance information without prior endmember information can be challenging when one or more endmembers have low abundance in the calibration data. For example, in scintillation dosimetry, the Cherenkov component of the stem effect is expected to dominate over the fluorescent component under high-energy irradiation conditions, making it more difficult to accurately recover the fluorescence spectrum. FIG. 9A depicts an example of a three-endmember spectral unmixing process applied to a calibration dataset, where one of the endmembers had significantly lower abundance compared to the others. Principal component analysis (PCA) was performed on the dataset, and FIG. 9A shows the first two principal components. The real endmembers formed a simplex within which the measurements were confined. FIG. 9A illustrates that the calibration measurements are mainly composed of Endmembers 1 and 2, with Endmember 3 having very small abundance. In such cases, it was found that using prior endmember information on the least abundant endmember can help retrieving this endmember, as well as the two others.

Figure 9B:
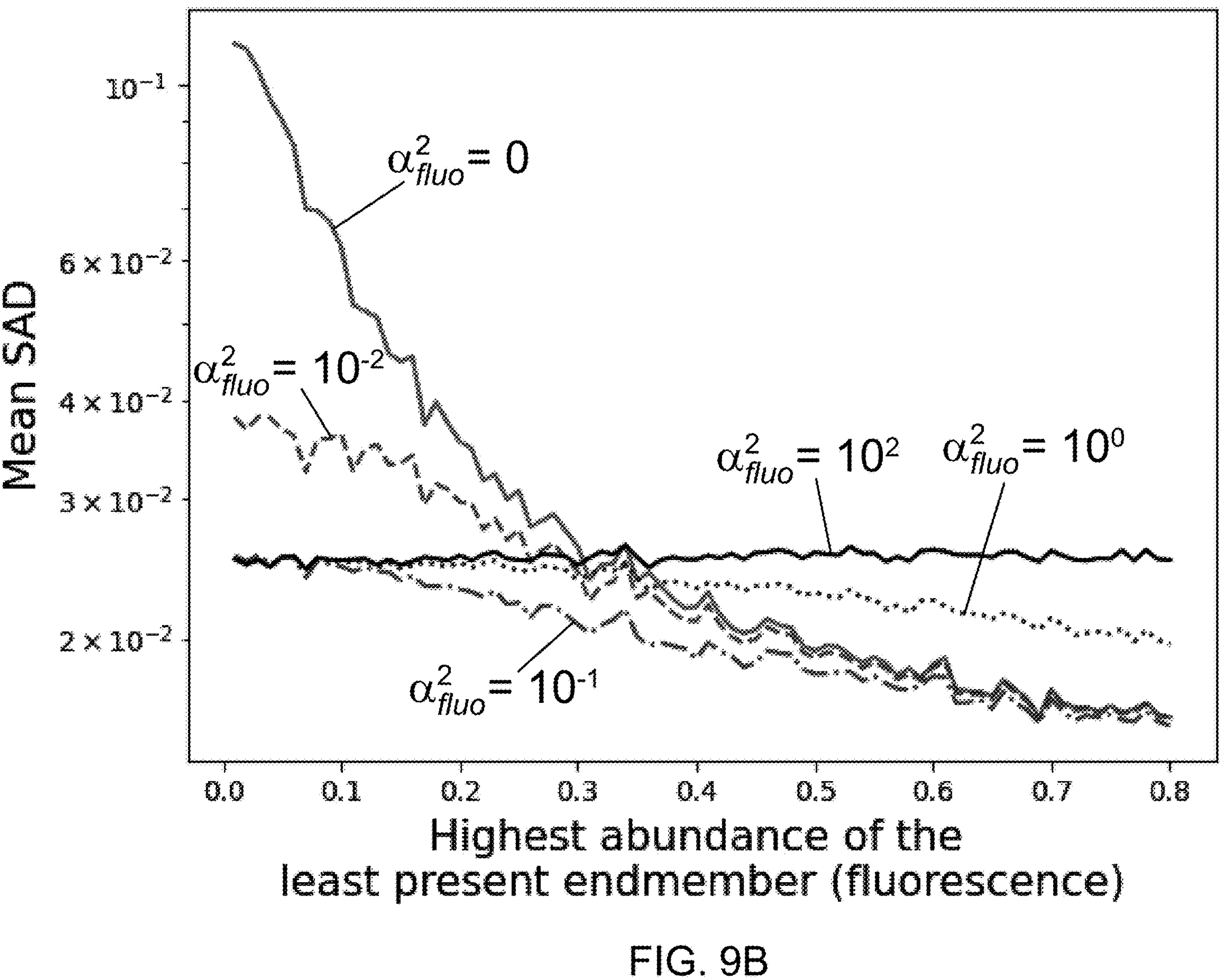
FIG. 9B illustrates the mean SAD between the ground truth and estimated spectra as a function of the highest abundance of the least present endmember in the calibration data, for different values of the trust coefficient $\alpha^2$ associated with the least present endmember.

FIG. 9B shows the mean SAD between the ground truth and estimated spectra as a function of the highest abundance of the least present endmember in the calibration data, for different values of the trust coefficient $\alpha^2$ associated with the least present endmember. This figure considers five endmembers, where the least present endmember corresponds to a fluorescence spectrum with an SAD of 0.0755 relative to the ground truth fluorescence spectrum. A value of $\alpha^2=0$ was used for the other four endmembers. An RMSE of approximately 0.0810 between the ground truth and prior abundances was assumed, with a fixed value of $\beta^2=1$ to account for the prior abundance information. FIG. 9B indicates that the mean SAD tends to increase when the abundances of one endmember become very small, which is often observed in the fluorescence spectrum generated by the delivery fiber used in scintillation dosimetry. To mitigate this issue, the use of prior endmember information for this endmember (i.e., $\alpha^2\neq0$) was found to be helpful in retrieving this particular endmember and decreasing the mean SAD between the real and estimated spectra.

C. Validation on Experimental Data. The NMF-PEAK approach was also validated on experimental data. As described earlier, two series of experimental measurements were carried out: one for computing the prior knowledge information on the endmembers and abundances (referred to as the prior reference calibration), and the other for applying the NMF-PEAK technique to calibrate an mPSD (referred to as the current calibration). Using the same setup as the one used for the current calibration, partial or total irradiation of all or some of the scintillators of the mPSD was performed to obtain independent dose measurements and verify calibration accuracy for dose measurements.

TABLE I

SAD BETWEEN ENDMEMBERS AND ERROR ON DOSE MEASUREMENTS. THE MEAN RMSE BETWEEN THE GROUND TRUTH AND PRIOR ABUNDANCES IS 0.0276

| | SAD relative to Ground Truth Endmembers | | | Dose Mean Percent Error relative to Reference Dose Measurements [%] | | |
|---|---|---|---|---|---|---|
| Endmember | Factory | NMF | NMF-PEAK | Factory | NMF | NMF-PEAK |
| Scintillation #1 | 0.0718 | 0.3140 | 0.0032 | (3 ± 11) | (−7 ± 32) | (−0.17 ± 0.28) |
| Scintillation #2 | 0.0252 | 1.1822 | 0.0056 | (−8 ± 15) | (7 ± 76) | (0.70 ± 0.69) |
| Scinullation #3 | 0.1650 | 0.8856 | 0.0056 | (2 ± 3) | (−4 ± 79) | (0.24 ± 0.81) |
| Fluorescence (fiber) | 0.0944 | 0.7335 | 0.0944 | — | — | — |
| Cherenkov (fiber) | 0.0265 | 0.8061 | 0.0038 | — | — | — |
| Mean | 0.0766 | 0.7843 | 0.0225 | (−1 ± 11) | (−2 ± 66) | (0.25 ± 0.73) |

For each of the five endmembers, Table I presented above lists the SAD between the ground truth endmembers for the user calibration process and (i) the factory endmember (i.e., the prior endmember information obtained from the reference calibration process), (ii) the estimated endmembers determined with the conventional NMF technique, and (iii)

the estimated endmembers determined with the NMF-PEAK technique. Table I also provides the dose mean percent error relative to reference dose measurements, obtained using (i) the factory endmembers, (ii) the estimated endmembers determined with the conventional NMF technique, and (iii) the estimated endmembers determined with the NMF-PEAK technique. In this example, the NMF-PEAK technique was implemented based on a series of eighteen calibration measurements corresponding to a series of eighteen different irradiation conditions, utilizing prior endmember information and prior abundance information. It should be noted that the values of $\alpha^2$ and $\beta^2$ were optimized in order to achieve optimal experimental results, but the average error in dose measurements would have been (0.45±1.82)% if $\alpha^2=0.1$ for the fluorescence spectrum, $\alpha^2=0$ for the other four spectra, and $\beta^2=1$ everywhere. The RMSE between the ground truth abundances and the prior abundance was 0.0276.

It is noteworthy that the non-negligible SAD values between the ground truth endmembers and the factory endmembers highlights the need for regular calibration of mPSDs. This is illustrated by the significantly lower SAD values associated with the estimated endmembers determined using the NMF-PEAK technique. Table I also reveals that the error in dose measurements, with respect to the reference dose measurements, was significantly reduced when dose measurements were obtained from the estimated endmembers determined with the NMF-PEAK technique rather than from the factory endmembers, further highlighting the potential benefit of the present techniques for calibrating mPSDs. Table I further shows that the SAD between the ground truth endmembers and the estimated endmembers determined with the conventional NMF technique ($\alpha^2=\beta^2=0$), and the corresponding error in dose measurements were large, and in fact, even larger than those obtained from the factory endmembers.

In the present description, similar features in the drawings have been given similar reference numerals. To avoid cluttering certain figures, some elements may not be indicated if they were already identified in a preceding figure. The elements of the drawings are not necessarily depicted to scale since emphasis is placed on clearly illustrating the elements and structures of the present embodiments. Positional descriptors indicating the location and/or orientation of one element with respect to another element are used herein for ease and clarity of description. Unless otherwise indicated, these positional descriptors should be taken in the context of the figures and should not be considered limiting. In particular, positional descriptors are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined as "and/or", unless stated otherwise.

Terms such as "substantially", "generally", and "about", which modify a value, condition, or characteristic should be understood to mean that the value, condition, or characteristic falls within acceptable tolerances for the proper functioning of the described embodiment or within an acceptable range of experimental error. In particular, the term "about" generally denotes a range of values that one skilled in the art would consider equivalent to the stated value (e.g., having the same or an equivalent function or result). In some instances, the term "about" means a variation of ±10% of the stated value. It should be noted that all numeric values used herein are assumed to be modified by the term "about", unless stated otherwise. The term "between" refers to a range defined by endpoints, inclusive of both endpoints, unless stated otherwise.

The term "based on" as used herein is intended to mean "based at least in part on", whether directly or indirectly, and to encompass both "based solely on" and "based partly on". In particular, the term "based on" may also be understood as meaning "from", "depending on", "representative of", "indicative of", "associated with", "relating to", and the like.

The terms "match", "matching", and "matched" refer herein to a condition where two elements are either identical or within a predetermined tolerance of each other. These terms encompass not only exact matches but also substantial, approximate, or subjective matches, as well as a best or highest match among various matching possibilities.

The terms "connected" and "coupled", along with their derivatives and variants, refer herein to any form of connection or coupling, whether direct or indirect, between two or more elements, unless stated otherwise. This connection or coupling can take various forms, including, but not limited to, mechanical, optical, electrical, magnetic, thermal, chemical, logical, fluidic, operational, or any combination thereof.

The term "concurrently" refers herein to the simultaneous or overlapping occurrence of two or more processes. The term "concurrently" does not necessarily imply complete synchronicity but encompasses various scenarios. These scenarios include the simultaneous occurrence of two processes; a first process that both begins and ends during the duration of a second process; and a first process that starts during the duration of a second process but ends after the second process is completed.

The term "measured" when referring to a quantity or parameter is intended to mean that the quantity or parameter can be measured either directly or indirectly. In the case of indirect measurement, the quantity or parameter can be derived, retrieved, inferred or otherwise determined from directly measured data.

The term "radiation" as used herein encompasses both particle radiation and electromagnetic radiation. Particle radiation includes beams of charged or neutral particles, encompassing subatomic particles, such as protons, neutrons, electrons and positrons, and heavier particles, such as alpha particles and carbon ions. Electromagnetic radiation includes emissions such as X-rays and gamma rays. The term "ionizing radiation" refers herein to radiation with sufficient energy to ionize the matter with which it interacts.

The terms "light" and "optical", and variants and derivatives thereof, are intended to refer herein to electromagnetic radiation in any appropriate region of the electromagnetic spectrum. These terms are not limited to visible light but also include invisible regions of the spectrum, such as infrared, ultraviolet, X-ray, and gamma radiation.

Numerous modifications could be made to the embodiments described above without departing from the scope of the appended claims.

The invention claimed is:

1. A method for spectrally unmixing spectral data originating from a set of spectral sources and comprising a series of one or more measured optical spectra, the method comprising:

modeling the spectral data using a current endmember matrix and a current abundance matrix to be determined, wherein the current endmember matrix comprises a set of current endmember spectra respectively corresponding to the set of spectral sources, and wherein the current abundance matrix indicates an abundance of each current endmember spectrum in the or each measured optical spectrum;

providing external prior spectral information comprising prior endmember information and prior abundance information, wherein the prior endmember information conveys at least partial prior knowledge about the current endmember matrix, and wherein the prior abundance information conveys at least partial prior knowledge about the current abundance matrix; and performing a spectral unmixing operation on the spectral data to determine a solution for the current endmember matrix and the current abundance matrix, wherein the spectral unmixing operation uses the external prior spectral information as input.

2. The method of claim 1, further comprising measuring the series of one or more measured optical spectra under a respective series of one or more current irradiation conditions, wherein measuring the or each measured optical spectrum comprises:

irradiating the spectral sources with ionizing radiation in accordance with the respective current irradiation condition; and detecting radiation-induced light emitted by the spectral sources in response to the ionizing radiation.

3. The method of claim 2, wherein the ionizing radiation comprises electromagnetic radiation.

4. The method of claim 2, wherein the ionizing radiation comprises particle radiation.

5. The method of claim 1, wherein providing the external prior spectral information comprises deriving the external prior spectral information from modeling data, experimental data, or both.

6. The method of claim 1, wherein providing the external prior spectral information comprises:

experimentally determining the prior endmember information as a prior endmember matrix, wherein the prior endmember matrix comprises a set of prior endmember spectra corresponding to the set of spectral sources; and experimentally determining the prior abundance information as a prior abundance matrix, comprising:

measuring a series of one or more prior optical spectra corresponding to light received from the set of spectral sources, or from an equivalent set of spectral sources, under a respective series of one or more prior irradiation conditions representative of the series of one or more current irradiation conditions; and deriving the prior abundance matrix from the series of one or more prior optical spectra and the prior endmember matrix, wherein the prior abundance matrix indicates an abundance of each prior endmember spectrum in the or each prior optical spectrum.

7. The method of claim 1, wherein the set of spectral sources comprises at least one scintillating component and at least one contaminating component.

8. The method of claim 1, further comprising measuring the spectral data with a spectral detection system, wherein the spectral detection system is a radiation dosimeter comprising:

a scintillation unit comprising at least one scintillating element configured to emit scintillation light in response to irradiation by an irradiation source, wherein the at least one scintillating element provides at least one of the spectral sources; and a spectral detector configured to detect the scintillation light emitted by the at least one scintillating element as at least part of the spectral data.

9. The method of claim 8, wherein the at least one scintillating element is a plurality of scintillating elements disposed at a plurality of locations within the scintillation unit.

10. The method of claim 8, wherein the radiation dosimeter comprises a collection light guide optically coupled to the at least one scintillating element and configured to deliver the scintillation light emitted by the at least one scintillating element to the spectral detector.

11. The method of claim 10, wherein the plurality of scintillating elements are disposed within the collection light guide.

12. The method of claim 10, wherein the collection light guide comprises an optical fiber.

13. The method of claim 10, wherein the collection light guide provides at least one of the spectral sources as either (i) a source of fluorescence radiation and a source of Cherenkov radiation; or (ii) a first source of Cherenkov radiation and a second source of Cherenkov radiation, the first and second sources of Cherenkov radiation corresponding to different emission locations within the collection light guide.

14. The method of claim 1, wherein performing the spectral unmixing operation comprises optimizing an objective function, wherein the objective function relates a difference between the spectral data and a product of the current endmember matrix and the current abundance matrix to be determined, and incorporates the external prior spectral information.

15. The method of claim 14, wherein optimizing the objective function comprises performing a non-negative matrix factorization (NMF) procedure.

16. A method for calibrating a spectral detection system having a spectral response comprising contributions from a set of spectral sources, the method comprising:

measuring the spectral response of the spectral detection system under a series of one or more current irradiation conditions to acquire current calibration data comprising a respective series of one or more current calibration spectra;

modeling the current calibration data using a current endmember matrix and a current abundance matrix to be determined, wherein the current endmember matrix comprises a set of current endmember spectra respectively corresponding to the set of spectral sources, and wherein the current abundance matrix indicates an abundance of each current endmember spectrum in the or each current calibration spectrum;

providing external prior calibration information comprising prior endmember information and prior abundance information, wherein the prior endmember information conveys at least partial prior knowledge about the current endmember matrix, and wherein the prior abundance information conveys at least partial prior knowledge about the current abundance matrix; and performing a spectral unmixing operation on the current calibration data to determine a solution for the current endmember matrix and the current abundance matrix, thereby calibrating the spectral detection system, wherein the spectral unmixing operation uses the external prior spectral information as input.

17. The method of claim 16, wherein measuring the spectral response of the spectral detection system comprises, for the or each current calibration spectrum:

irradiating the spectral sources with ionizing radiation in accordance with the respective current irradiation condition; and detecting radiation-induced light emitted by the spectral sources in response to the ionizing radiation.

18. The method of claim 16, wherein providing the external prior calibration information comprises:

experimentally determining the prior endmember information as a prior endmember matrix, wherein the prior endmember matrix comprises a set of prior endmember spectra corresponding to the set of spectral sources; and experimentally determining the prior abundance information as a prior abundance matrix, comprising:

measuring a series of one or more prior calibration spectra corresponding to light received from the set of spectral sources, or from an equivalent set of spectral sources, under a respective series of one or more prior irradiation conditions representative of the one or more current irradiation conditions; and determining the prior abundance matrix from the series of one or more prior calibration spectra and the prior endmember matrix, wherein the prior abundance matrix indicates an abundance of each prior endmember spectrum in the or each prior calibration spectrum.

19. The method of claim 16, wherein the spectral detection system is a radiation dosimeter comprising:

a scintillation unit comprising at least one scintillating element configured to emit scintillation light in response to irradiation by an irradiation source, wherein the at least one scintillating element provides at least one of the spectral sources; and a spectral detector configured to detect the scintillation light emitted by the at least one scintillating element as at least part of the spectral response.

20. The method of claim 19, wherein the at least one scintillating element is a plurality of scintillating elements disposed at a plurality of locations within the scintillation unit.

21. The method of claim 19, wherein the radiation dosimeter comprises a collection light guide optically coupled to the at least one scintillating element and configured to deliver the scintillation light emitted by the at least one scintillating element to the spectral detector, and wherein the plurality of scintillating elements are disposed within the collection light guide.

22. The method of claim 21, wherein the collection light guide comprises an optical fiber.

23. The method of claim 21, wherein the collection light guide provides at least one of the spectral sources as either (i) a source of fluorescence radiation and a source of Cherenkov radiation; or (ii) a first source of Cherenkov radiation and a second source of Cherenkov radiation, the first and second sources of Cherenkov radiation corresponding to different emission locations within the collection light guide.

24. The method of claim 16, wherein performing the spectral unmixing operation comprises optimizing an objective function, wherein the objective function relates a difference between the spectral data and a product of the current endmember matrix and the current abundance matrix to be determined, and incorporates the external prior calibration information.

25. The method of claim 24, wherein optimizing the objective function comprises performing a non-negative matrix factorization (NMF) procedure.

26. A non-transitory computer readable storage medium having stored thereon computer readable instructions that, when executed by a processor, cause the processor to perform the spectral unmixing method of claim 1.

27. A non-transitory computer readable storage medium having stored thereon computer readable instructions that, when executed by a processor, cause the processor to perform a method for calibrating a spectral detection system having a spectral response comprising contributions from a set of spectral sources, the method comprising:

receiving current calibration data comprising a series of one or more current calibration spectra acquired by measuring the spectral response of the spectral detection system under a respective series of one or more current irradiation conditions;

modeling the current calibration data using a current endmember matrix and a current abundance matrix to be determined, wherein the current endmember matrix comprises a set of current endmember spectra respectively corresponding to the set of spectral sources, and wherein the current abundance matrix indicates an abundance of each current endmember spectrum in the or each current calibration spectrum;

providing external prior calibration information comprising prior endmember information and prior abundance information, wherein the prior endmember information conveys at least partial prior knowledge about the current endmember matrix, and wherein the prior abundance information conveys at least partial prior knowledge about the current abundance matrix; and performing a spectral unmixing operation on the current calibration data to determine a solution for the current endmember matrix and the current abundance matrix, thereby calibrating the spectral detection system, wherein the spectral unmixing operation uses the external prior spectral information as input.

* * * * *